(12) United States Patent
Rule et al.

(10) Patent No.: US 11,694,187 B2
(45) Date of Patent: Jul. 4, 2023

(54) CONSTRAINING TRANSACTIONAL CAPABILITIES FOR CONTACTLESS CARDS

(71) Applicant: Capital One Services, LLC, McLean, VA (US)

(72) Inventors: Jeffrey Rule, Chevy Chase, MD (US); Paul Moreton, Glen Allen, VA (US); Wayne Lutz, Fort Washington, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/503,142

(22) Filed: Jul. 3, 2019

(65) Prior Publication Data
US 2021/0004803 A1    Jan. 7, 2021

(51) Int. Cl.
*G06Q 20/40* (2012.01)
*G06K 19/07* (2006.01)
(Continued)

(52) U.S. Cl.
CPC ....... *G06Q 20/352* (2013.01); *G06K 19/0723* (2013.01); *G06Q 20/202* (2013.01);
(Continued)

(58) Field of Classification Search
CPC .................................................. G06Q 20/409
See application file for complete search history.

(56) References Cited

U.S. PATENT DOCUMENTS

| 4,683,553 A | 7/1987 | Mollier |
|---|---|---|
| 4,827,113 A | 5/1989 | Rikuna |

(Continued)

FOREIGN PATENT DOCUMENTS

| CA | 3010336 A1 | 7/2017 |
|---|---|---|
| CN | 101192295 A | 6/2008 |

(Continued)

OTHER PUBLICATIONS

Yinzhi Cao, Xiang Pan and Yan Chen, SafePay: Protecting against Credit Card Forgery with Existing Magnetic Card Readers, 2015, IEEE Conference on Communications and Network Security (CNS), pp. 166-171 (Year: 2015).*

(Continued)

*Primary Examiner* — Mamon Obeid
*Assistant Examiner* — Zehra Raza
(74) *Attorney, Agent, or Firm* — KDW Firm PLLC

(57) ABSTRACT

Systems, methods, articles of manufacture, and computer-readable media. A communications interface may receive an indication that a server preauthorized a transaction. The communications interface may receive, from a point of sale device, an indication to pay for the transaction. The contactless card may determine, based on rules stored in the memory, that the location of the mobile device is within one or more locations the contactless card is permitted for use. The contactless card may generate transaction data comprising: indications of an account number and an expiration date of the contactless card, and the indication of the preauthorization. The contactless card may transmit the transaction data to the POS device as payment for the transaction. The server may authorize payment for the transaction using at least a portion of the transaction data based at least in part on identifying the indication of the preauthorization in the transaction data.

18 Claims, 15 Drawing Sheets

(51) Int. Cl.
  *G06Q 20/20* (2012.01)
  *G06Q 20/32* (2012.01)
  *G06Q 20/38* (2012.01)
  *H04L 9/08* (2006.01)
  *G06Q 20/34* (2012.01)

(52) U.S. Cl.
  CPC ..... *G06Q 20/3224* (2013.01); *G06Q 20/3829* (2013.01); *G06Q 20/409* (2013.01); *G06Q 20/4018* (2013.01); *H04L 9/088* (2013.01); *G06Q 2220/00* (2013.01)

(56) References Cited

U.S. PATENT DOCUMENTS

| | | |
|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,917,168 A | 6/1999 | Nakamura et al. |
| 5,929,413 A | 7/1999 | Gardner |
| 5,960,411 A | 9/1999 | Hartman et al. |
| 5,984,180 A | 11/1999 | Albrecht |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,784,685 B1 | 8/2010 | Hopkins, III |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |

(56) References Cited

U.S. PATENT DOCUMENTS

| | | |
|---|---|---|
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B1 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,916,608 B1 * | 3/2018 | Ramalingam ...... G06Q 30/0267 |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,277,586 B1 | 4/2019 | Yau et al. |
| 10,510,074 B1 | 12/2019 | Rule et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0184145 A1 * | 8/2005 | Law .................. G06Q 20/0855 |
| | | 235/380 |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0064378 A1 | 3/2006 | Clementz et al. |
| 2006/0085848 A1 | 4/2006 | Aissi et al. |
| 2006/0136334 A1 | 6/2006 | Atkinson et al. |

(56) References Cited

U.S. PATENT DOCUMENTS

| | | |
|---|---|---|
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0198432 A1 | 8/2007 | Pitroda et al. |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0254440 A1* | 10/2009 | Pharris ............... G06Q 20/105 705/17 |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Obome |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0043976 A1 | 2/2013 | Creguer et al. |
| 2013/0048713 A1 | 2/2013 | Pan |
| 2013/0054474 A1 | 2/2013 | Yeager |
| 2013/0055202 A1 | 2/2013 | Dudek et al. |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Caiman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0262317 A1 | 10/2013 | Collinge et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0061301 A1 | 3/2014 | Cho et al. |
| 2014/0067690 A1 | 3/2014 | Pitroda et al. |

(56) References Cited

U.S. PATENT DOCUMENTS

| | | |
|---|---|---|
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032626 A1 | 1/2015 | Dill et al. |
| 2015/0032635 A1 | 1/2015 | Guise |
| 2015/0071486 A1 | 3/2015 | Rhoads et al. |
| 2015/0082326 A1 | 3/2015 | Milliron et al. |
| 2015/0088757 A1 | 3/2015 | Zhou et al. |
| 2015/0089586 A1 | 3/2015 | Ballesteros |
| 2015/0121464 A1* | 4/2015 | Hughes, Jr. ............ G06F 21/31 726/4 |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0220963 A1 | 8/2015 | Priebatsch |
| 2015/0254665 A1 | 9/2015 | Bondesen et al. |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012432 A1* | 1/2016 | Meshkati ............ G06Q 20/3821 705/44 |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267262 A1* | 9/2016 | Taniguchi ............... G06F 21/32 |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0068960 A1 | 3/2017 | Kwak et al. |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0323297 A1 | 11/2017 | Shanmugam |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0218345 A1 | 8/2018 | Spratt et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0164158 A1 | 5/2019 | Koeppel et al. |
| 2019/0238517 A1 | 8/2019 | D'Agostino et al. |
| 2019/0354979 A1 | 11/2019 | Crawford |
| 2020/0027083 A1* | 1/2020 | Patrni ..................... G06Q 20/12 |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| EP | 3258373 A1 | 12/2017 |
| EP | 3343488 A1 | 7/2018 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |

(56) References Cited

FOREIGN PATENT DOCUMENTS

| | | |
|---|---|---|
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |

OTHER PUBLICATIONS

Dhamdhere, P., "Key Benefits of a Unified Platform for Loyalty, Referral Marketing, and UGC", Annex Cloud [online] May 19, 2017 [retrieved on Jul. 3, 2019]. Retrieved from Internet URL: https://www.annexcloude.com/blog/benefits-unified-platform/, 13 pages.

Batina, L. and Poll, E., "SmartCards and RFID", Course PowerPoint Presentation for IPA Security Course, Digital Security at University of Nijmegen, Netherlands (date unknown) 75 pages.

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-2019 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https//tools.ietf.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-brw1103/mac, 3 pages.

Menghin, M.J., "Power Optimization Techniques for Near Field Communication Systems", 2014 Dissertation at Technical Univer-

(56) References Cited

OTHER PUBLICATIONS sity of Graz [online]. Retrieved from Internet URL: https://diglib.tugraz.at/download.php?d=576a7b910d2d6&location=browse, 135 pages.

Mareli, M., et al., "Experimental evaluation of NFC reliability between an RFID tag and a smartphone", Conference paper (2013) IEEE Africon At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera Slam", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card User Authentication for Contactless Smart Cards based on Gesture Recognition", paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

International Search Report and Written Opinion for International Patent Application No. PCT/US2020/040261 dated Sep. 28, 2020, 13 pages.

International Search Report and Written Opinion for International Patent Application No. PCT/US2020/061930 dated Feb. 18, 2021, 10 pages.

\* cited by examiner

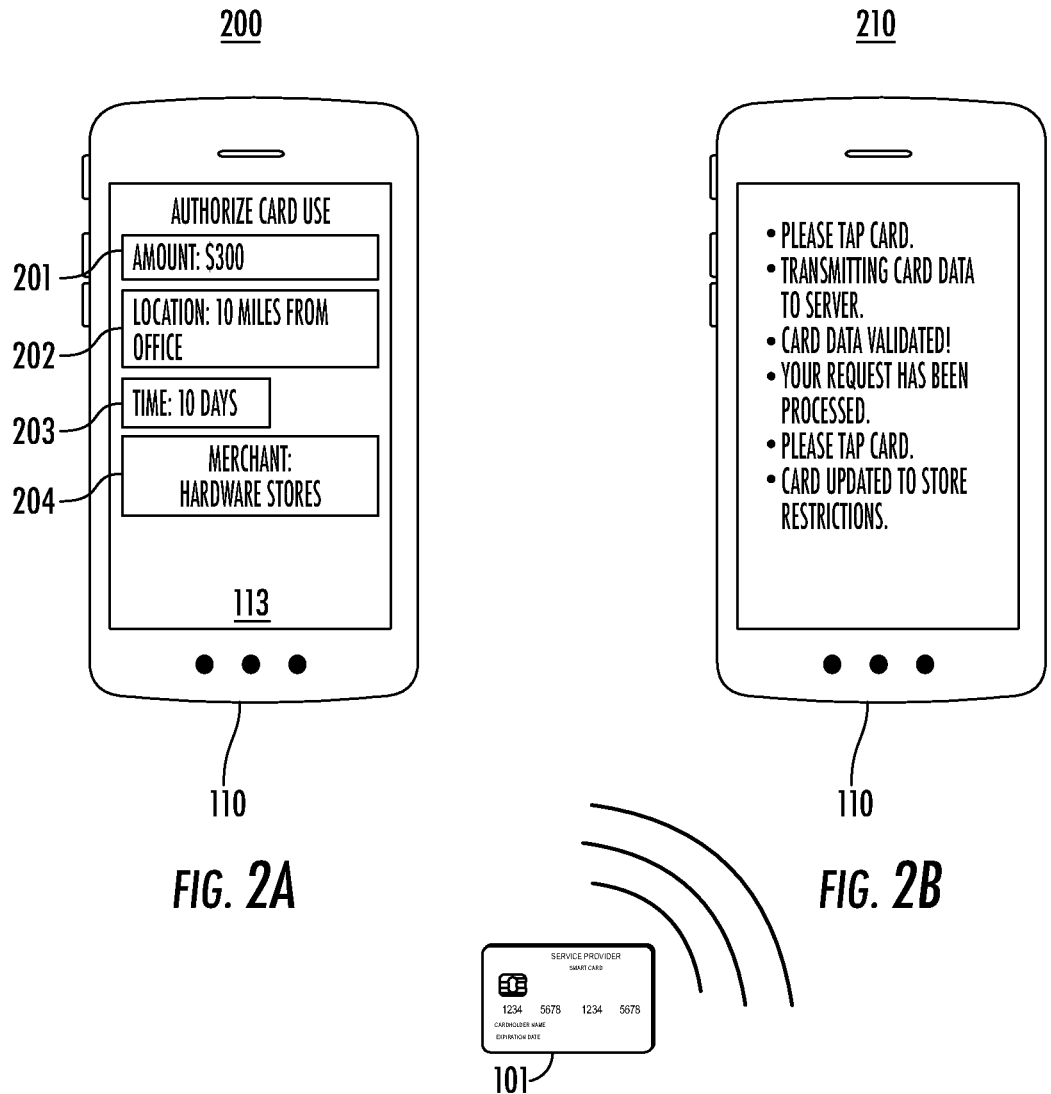

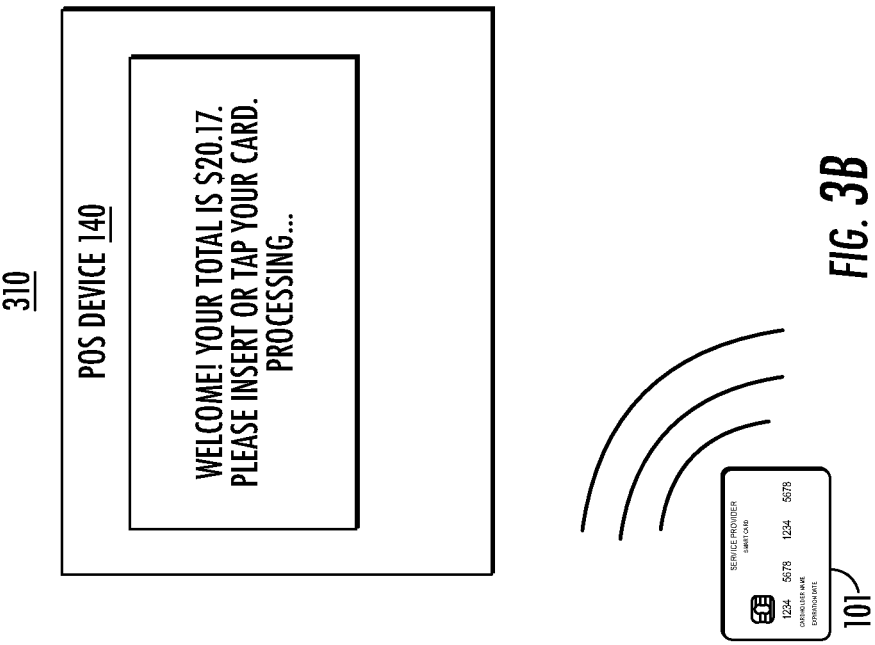
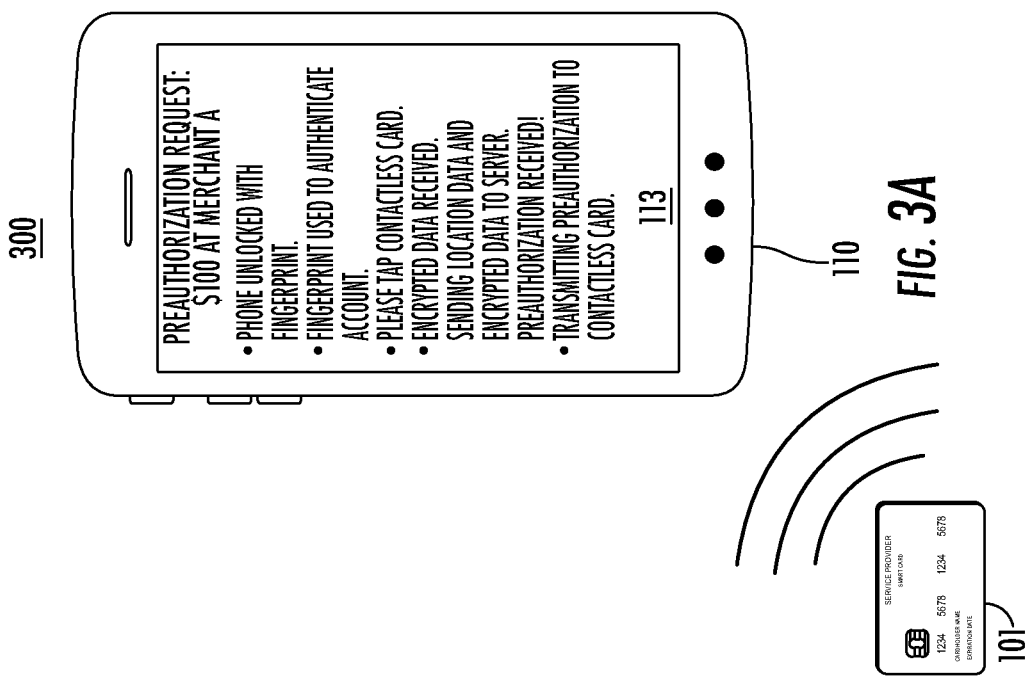
FIG. 3B
FIG. 3A

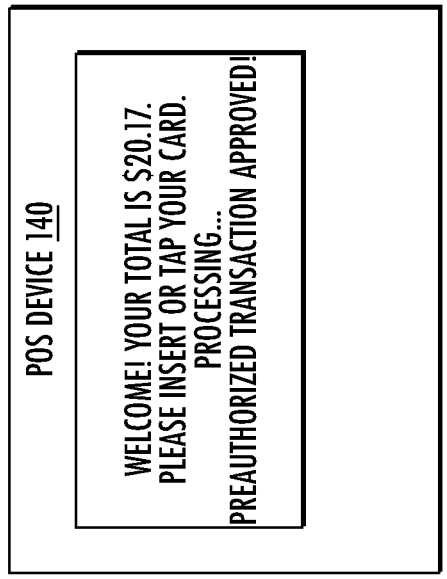
FIG. 3D
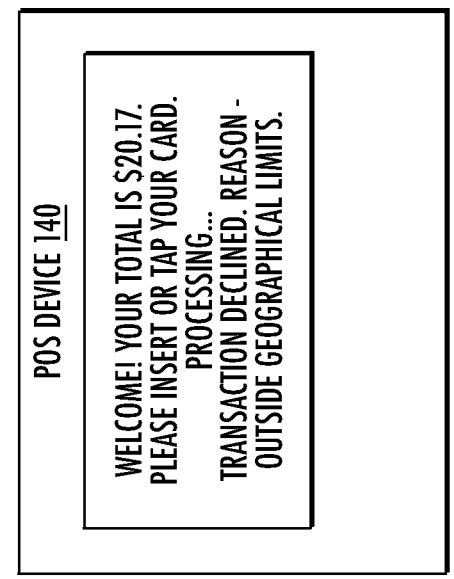
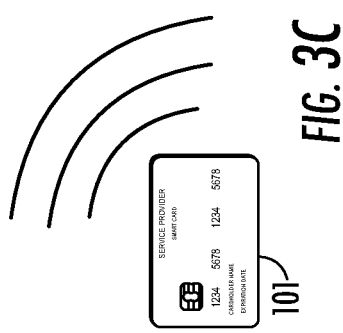
FIG. 3C

CONSTRAINING TRANSACTIONAL CAPABILITIES FOR CONTACTLESS CARDS

TECHNICAL FIELD

Embodiments herein generally relate to contactless cards, and more specifically, to constraining transactional capabilities for contactless cards.

BACKGROUND

Cardholders (e.g., credit card holders, bank card holders, etc.) often obtain additional physical cards and/or virtual card numbers for trusted individuals, such as family members, employees, and the like. However, doing so may expose security risks. Conventional solutions do not provide the requisite security mechanisms to ensure that the physical cards and/or virtual card numbers are used in accordance with any defined restrictions.

SUMMARY

Embodiments disclosed herein provide systems, methods, articles of manufacture, and computer-readable media for constraining transactional capabilities of contactless cards. In one example, a communications interface may receive, from a mobile device executing an account application, an indication that a server preauthorized a transaction based on location data describing a location of the mobile device and verification of encrypted data, the encrypted data generated by the contactless card using a cryptographic algorithm and a private key stored in the memory of the contactless card, one or more credentials for an account associated with the contactless card received by the account application. The communications interface may receive, from a point of sale (POS) device, an indication to pay for the transaction using the contactless card. The contactless card may determine, based on one or more rules stored in the memory, that the location of the mobile device is within a threshold distance of one or more locations the contactless card is permitted for use. The contactless card may generate transaction data comprising: (i) indications of an account number and an expiration date of the contactless card, and (ii) the indication of the preauthorization of the transaction by the server. The contactless card may transmit the transaction data to the POS device as payment for the transaction, the server to authorize payment for the transaction using at least a portion of the transaction data based at least in part on identifying the indication of the preauthorization of the transaction by the server in the transaction data.

BRIEF DESCRIPTION OF THE DRAWINGS

FIGS. 2A-2B illustrate embodiments of constraining transactional capabilities for contactless cards.

FIGS. 3A-3D illustrate embodiments of constraining transactional capabilities for contactless cards.

DETAILED DESCRIPTION

Figure 1A:
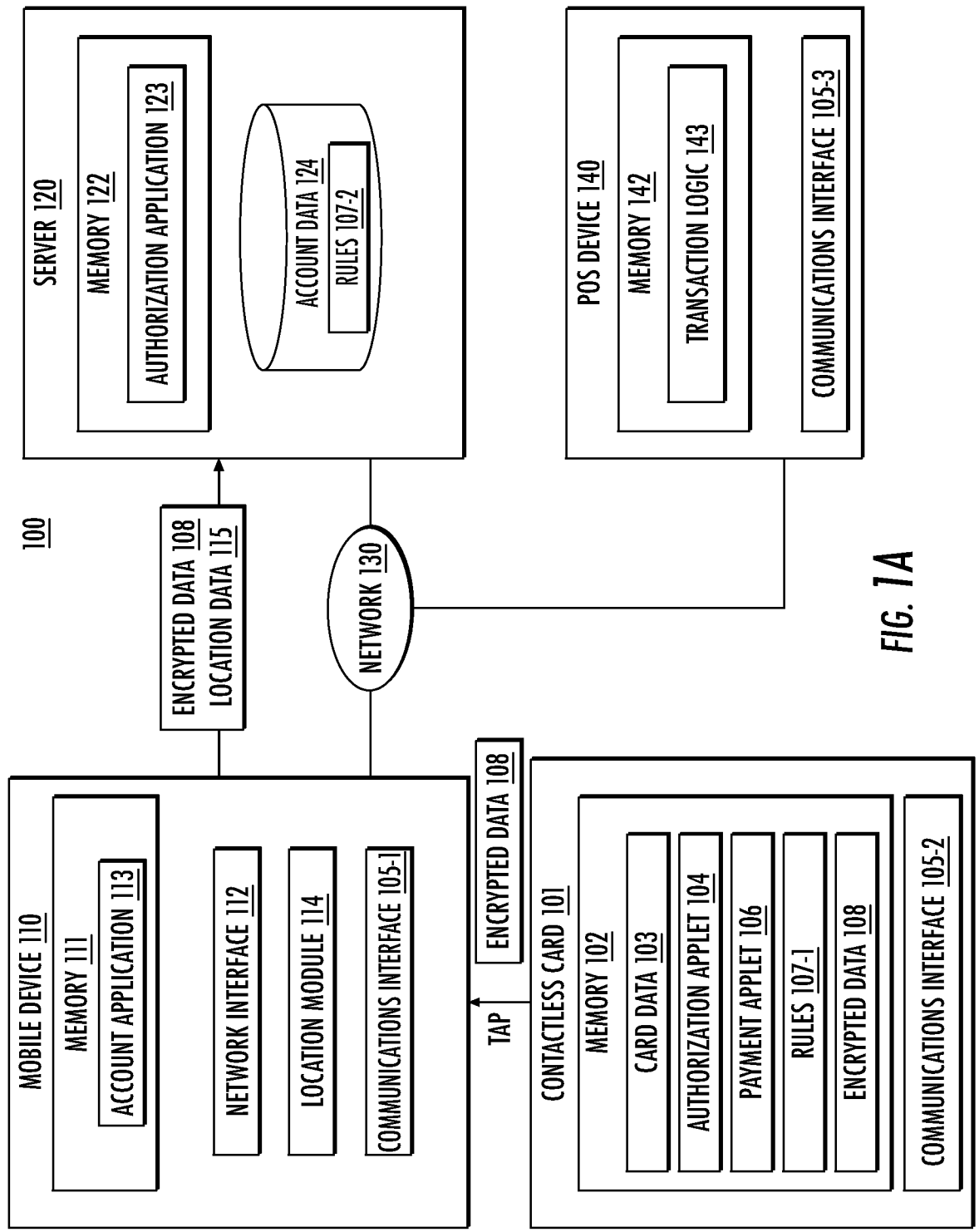
FIGS. 1A-1D illustrate embodiments of a system to constrain transactional capabilities for contactless cards.

Embodiments disclosed herein provide secure techniques to constrain transactional capabilities of contactless cards. Generally, a contactless card may be programmed to include restrictions on the use of the contactless card. The restrictions may include geographic (or location) restrictions, amount restrictions, and/or time restrictions. When the cardholder attempts to use the contactless card, logic in the contactless card may determine if the attempted use is permitted in light of the restrictions. For example, the contactless card may periodically communicate with a mobile device executing an account management application. The contactless card may periodically receive location data from the account management application, where the location data describes a location of the mobile device (and/or the contactless card). When the cardholder attempts to use the contactless card, the logic in the contactless card may determine whether the received location data is within one or more geographic locations the contactless card is permitted for use. For example, the contactless card may be limited to use in a 5-mile radius from a cardholder's home. If the received location data indicates the mobile device and/or the contactless card are 10 miles away from the home, the contactless card may decline to process the attempted transaction. Similarly, if the location data indicates the mobile device and/or the contactless card are 1 mile away from the home, the contactless card may permit the attempted transaction.

In some embodiments, the location data may be used as part of a preauthorization process for transactions. For example, the user may tap their contactless card to the mobile device executing the account application to preauthorize a large transaction while shopping for an expensive item, such as a watch. The account application may receive encrypted data generated by the contactless card. The account application may transmit the encrypted data and location data describing the current location of the mobile device to a server. The server may decrypt the encrypted data, thereby validating the encrypted data. The server may further determine that the location data indicates the mobile device and/or the contactless card are within one or more locations the contactless card is permitted for use. Similarly, the server may verify any requested purchase amount and/or time duration for the preauthorization. The server may determine to preauthorize a transaction using the contactless card and transmit an indication of the preauthorization to the account application executing on the mobile device. The indication of preauthorization may be transmitted from the mobile device to the contactless card. When the contactless card determines that the card is being used to pay for a transaction, the contactless card may write the indication of preauthorization to one or more fields of a payment payload that is transmitted to a point of sale (POS) device. The POS device may transmit the payment payload including the indication of preauthorization to the server. The server may authorize payment for the transaction based at least in part on identifying the indication of preauthorization in the payment payload. The server may further verify any data received from the mobile device responsive to a tap of the contactless card at the time of attempted purchase (e.g., requested purchase amount, time, location, etc.). The server may then transmit an indication of the authorization to the POS device.

Advantageously, embodiments disclosed herein improve the security of all devices and associated data. For example, the preauthorization technique may reduce fraud and/or security risks for the contactless card. As another example, the validation performed by the server provides safeguards to ensure that an authorized user has access to the physical card. Further still, by enforcing rules associated with the use of the physical card and/or virtual account number, the security of the associated account is preserved.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more contactless cards 101, one or more mobile devices 110, a server 120, and one or more point of sale devices 140. The contactless cards 101 are representative of any type of payment cards, such as a credit card, debit card, ATM card, gift card, and the like. The contactless cards 101 may comprise one or more communications interfaces 105-2, such as a radio frequency identification (RFID) chip, configured to communicate with the communications interface 105-1 of the mobile devices 110 via NFC, the EMV standard, or other short-range protocols in wireless communication. Although NFC is used as an example communications protocol, the disclosure is equally applicable to other types of wireless communications, such as the EMV standard, Bluetooth, and/or Wi-Fi. The mobile devices 110 are representative of any type of network-enabled computing devices, such as smartphones, tablet computers, wearable devices, laptops, portable gaming devices, mobile devices, and the like. The server 120 is representative of any type of computing device, such as a server, workstation, compute cluster, cloud computing platform, virtualized computing system, and the like. The POS devices 140 are representative of any type of device for processing payments, such as card reader devices, smartphones, tablet computers, desktop computers, POS terminals, servers, workstations, laptop computers, and the like.

As shown, a memory 111 of the mobile device 110 includes an instance of an account application 113. The account application 113 allows users to perform various account-related operations, such as viewing account balances, purchasing items, processing payments, defining restrictions on contactless card 101, communicating location data to the contactless card 101, and communicating with the server 120 for preauthorization. Initially, a user may authenticate using authentication credentials to access certain features of the account application 113. For example, the authentication credentials may include a username and password, biometric credentials (e.g., fingerprints, Face ID, etc.), and the like. In some embodiments, the user may perform additional authentication (e.g., multi-factor authentication) in addition to providing the authentication credentials. For example, the user may provide, to the account application 113, a one-time passcode received in a text message, the biometric credentials associated with the account, and/or a temporary code generated by an authentication application (not pictured). In some embodiments, the contactless card 101 may generate and transmit encrypted data 108 that is used as an additional authentication factor. In some embodiments, the account application 113 may transmit an indication to the contactless card 101 specifying that the user has been authenticated using the authentication credentials.

When the user is authenticated into their account in the account application 113, the account application 113 may receive location data from the location module 114. The location data may generally describe the location of the mobile device 110. The location module 114 may be any device which determines location, such as a global positioning system (GPS) module, Global Navigation Satellite System (GNSS) module, a Galileo module, etc. In some embodiments, the network interface 112 may provide location data that describes the location of the mobile device (e.g., based on cellular network signals, tower locations, etc.). The account application 113 may periodically provide the location data generated to the contactless card 101 via the communications interfaces 105-1, 105-2. As described in greater detail below, the contactless card 101 may use the location data to restrict the transactional capabilities of the contactless card 101. For example, the rules 107-1 of the contactless card 101 may specify one or more locations the contactless card 101 may be used to pay for transactions. If the received location data is not within the one or more locations specified in the rules 107-1 (and/or within a threshold distance of the one or more locations) the contactless card 101 may refrain from generating data and/or transmitting data to the POS device 140 to pay for a transaction.

In one embodiment, a user may wish to obtain preauthorization for a purchase using the contactless card 101. For example, the user may wish to purchase an expensive item of jewelry using the contactless card 101 while at a jewelry store. To receive preauthorization, the user may generally unlock their mobile device 110 and authenticate in the account application 113. When the user authenticates in the account application 113, the user may access a preauthorization page of the account application 113. In some embodiments, the preauthorization page may be part of a separate application rather a page of the account application 113. In response, the account application 113 may output a notification on the mobile device 110 specifying to tap the contactless card 101 to the mobile device 110, thereby bringing the contactless card 101 sufficiently close to the communications interface 105-1 of the mobile device 110 to enable data transfer (e.g., NFC data transfer, Bluetooth data transfer, etc.) between the communications interface 105-2 of the contactless card 101 and the communications interface 105-1 of the mobile device 110. The authorization applet 104 executing on a processor (not pictured) of the contactless card 101 may then generate and transmit encrypted data 108 to the mobile device 110 via the communications interface 107. The authorization applet 104 of the contactless card 101 may use a cryptographic algorithm to generate a cryptographic payload of encrypted data 108 based at least in part on a private key stored in the memory 102 of the contactless card 101. In such an embodiment, the private key and some other piece of data (e.g., a customer identifier, an account identifier, etc.) may be provided as the input to the cryptographic algorithm, which outputs the encrypted data 108. Generally, the authorization applet 104 may use any type of cryptographic algorithm and/or system to generate the encrypted data 108, and the use of a specific cryptographic algorithm as an example herein should not be considered limiting of the disclosure. In some embodiments, the authorization applet 104 may perform encryption using a key diversification technique to generate the encrypted data 108. Examples of key diversification techniques are described in U.S. patent application Ser. No. 16/205,119, filed Nov. 29, 2018. The aforementioned patent application is incorporated by reference herein in its entirety. In one embodiment, the authorization applet 104 generates the encrypted data 108 based at least in part on an indication received from the account application 113 specifying that the user has been authenticated into their account using account credentials.

In some such embodiments, the authorization applet 104 determines whether the most recently received location data is within one or more locations specified in the rules 107-1 as permitted locations to use the contactless card 101. If the location data is within the one or more locations specified in the rules 107-1, the authorization applet 104 may generate the encrypted data 108. If the location data is not within the one or more locations specified in the rules 107-1, to preserve security, the authorization applet 104 may refrain from generating the encrypted data 108. Furthermore, the authorization applet 104 may apply other rules in the rules 107-1 when determining whether to generate the encrypted data 108. For example, the rules 107-1 may specify a time when the contactless card 101 can be used (e.g., during the hours of 8 AM-5 PM on weekdays, within 1 year of issuance, etc.). As another example, the rules 107-1 may specify an amount limit for any transaction (or multiple transactions) using the contactless card 101. If the current time is not within the time specified in the rules 107-1, the authorization applet 104 may refrain from generating the encrypted data 108. Similarly, if the user provides a dollar amount for the preauthorization to the account application 113 (which may be transmitted to the contactless card 101) exceeds the dollar amount limit specified in the rules 107-1, the authorization applet 104 may refrain from generating the encrypted data 108.

Once generated, the authorization applet 104 may transmit the encrypted data 108 to the account application 113 of the mobile device 110, e.g., via NFC. For example, the authorization applet 104 may transmit the encrypted data 108 in an NDEF tag that specifies to an operating system (OS, not pictured) of the mobile device 110 to launch the account application 113 to receive the encrypted data 108. More generally, when communicating with the mobile device 110, data generated by the contactless card 101 may specify to launch the account application 113 (e.g., via an intent attribute). The OS may detect the NFC signal from the contactless card 101, read the data transmitted by the contactless card 101, and launch the account application 113.

The account application 113 may transmit the encrypted data 108 and the location data 115 generated by the location module 114 to the authorization application 123 of the server 120. The account application 113 may further transmit other data to the server 120, such as the requested amount for preauthorization. The authorization application 123 may attempt to authenticate the received encrypted data 108. For example, the authorization application 123 may attempt to decrypt the encrypted data 108 using a copy of the private key stored in the memory 122 of the server 120. The private key may be identical to the private key stored in the memory 102 of the contactless card 101, where each contactless card 101 is manufactured to include a unique private key (and the server 120 stores a corresponding copy of each unique private key). Therefore, the authorization application 123 may successfully decrypt the encrypted data 108, thereby verifying the encrypted data 108. Although the private key is stated as being stored in the memory 122, the private key may be stored elsewhere, such as in a secure element and/or a hardware security module (HSM). In such embodiments, the secure element and/or the HSM may decrypt the encrypted data 108 using the private key and a cryptographic function.

For example, as stated, the customer identifier associated with the contactless card 101 may be used to generate the encrypted data 108. In such an example, the authorization application 123 may decrypt the encrypted data 108 using the private key of the server 120. If the result of the decryption yields the customer identifier associated with the account in the account data 124, the authorization application 123 verifies the encrypted data 108. If the authorization application 123 is unable to decrypt the encrypted data to yield the expected result (e.g., the customer identifier of the account associated with the contactless card 101), the authorization application 123 does not validate the encrypted data 108. Due to the failed verification, the authorization application 123 may not preauthorize the requested transaction.

More generally, as part of the preauthorization process, the authorization application 123 may determine whether the location data 115 is within one or more locations specified in the rules 107-2 of the account data 124 for the account as permitted locations to use the contactless card 101. If the location data is within the one or more locations specified in the rules 107-2, the authorization application 123 preauthorize the transaction. If the location data is not within the one or more locations specified in the rules 107-1, to preserve security, the authorization application 123 may refrain from preauthorizing the transaction. Similarly, if a time restriction for using the contactless card 101 in the rules 107-2 is not satisfied by a time associated with the preauthorization request, the authorization application 123 may refrain from preauthorizing the transaction. Further still, if a transaction amount restriction is not satisfied by the amount associated with the preauthorization request, the authorization application 123 may refrain from preauthorizing the transaction.

In some embodiments, the authorization application 123 may return a binary indication of preauthorization (e.g., preauthorized and/or not preauthorized) as a preauthorization result. In other embodiments, the authorization application 123 may select a preauthorization level from one or more preauthorization levels as a preauthorization result. For example, the highest level of preauthorization may be selected when the authorization application 123 successfully decrypts the encrypted data 108 and determines that the preauthorization request complies with the restrictions in the rules 107-2. As another example, the second level of preauthorization, less than the highest level of preauthorization, may be selected if the authorization application 123 successfully decrypts the encrypted data 108 and determines that the preauthorization request does not comply with at least one of the restrictions in the rules 107-2. As another example, the third level of preauthorization, less than the highest level of preauthorization, may be selected if the authorization application 123 does not successfully decrypt the encrypted data 108 a and determines that the preauthorization request complies with the restrictions in the rules 107-2. As another example, the lowest level of preauthorization, lower than the highest, second, and third levels of preauthorization, may be selected when the authorization application 123 does not successfully decrypt the encrypted data 108 and determines that the preauthorization request does not comply with at least one of the restrictions in the rules 107-2. Regardless of the type of preauthorization result, in some embodiments, the authorization application 123 may perform additional fraud vector analyses and preauthorize and/or decline to preauthorize the transaction based on the additional analyses.

Figure 1B:
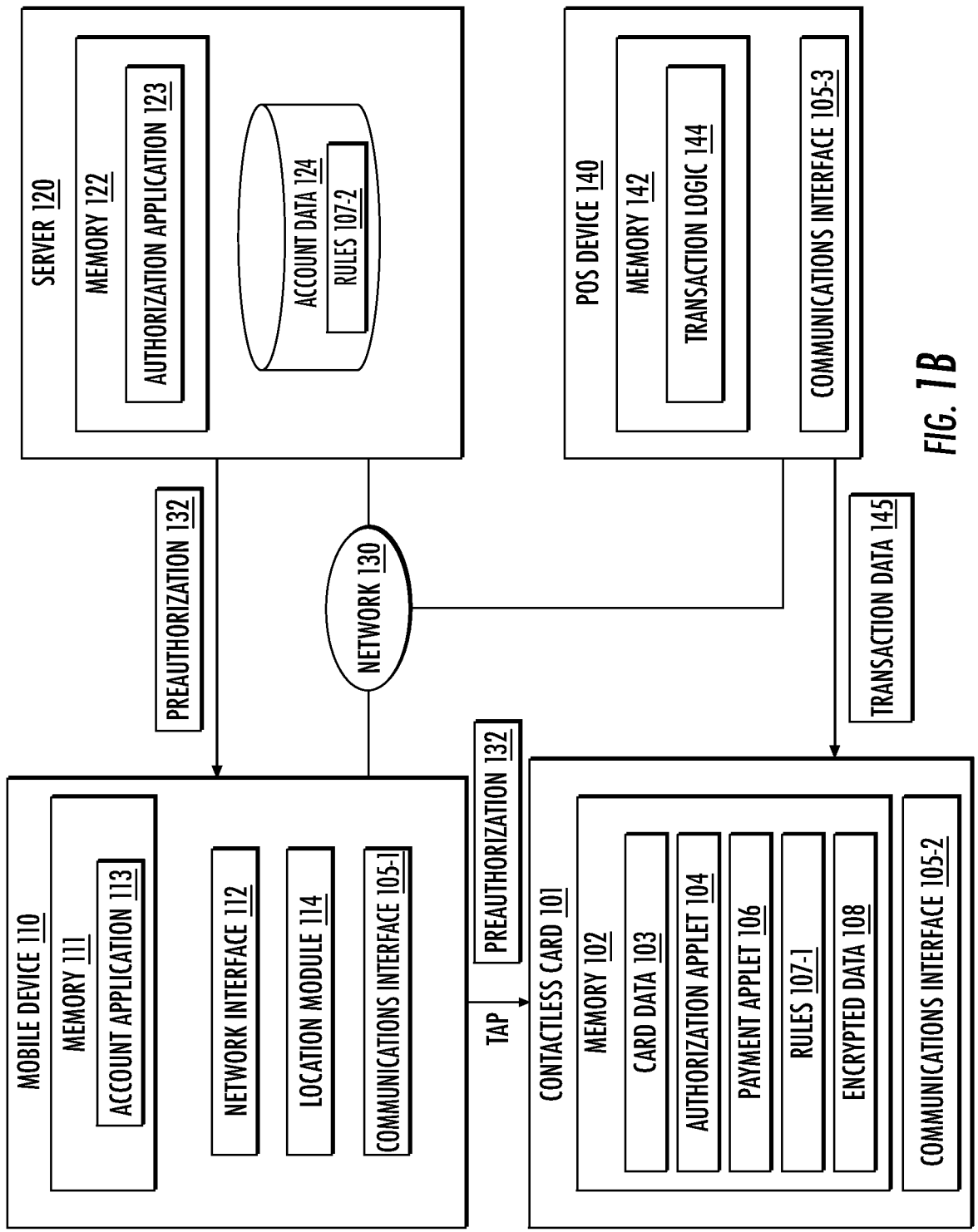

As shown in FIG. 1B, once the authorization application 123 validates the encrypted data 108 and determines a preauthorization result, the authorization application 123 transmits an indication of the preauthorization 132 to the mobile device 110. The preauthorization result 132 may include an associated timestamp, the received location data 115, the preapproval amount, and any other attribute as metadata. The authorization application 123 may further store the preauthorization result 132 in the account data 124 for the account associated with the contactless card. Once received, the account application 113 may output an indication specifying to tap the contactless card 101 to the mobile device 110. Once tapped, the account application 113 may transmit the indication of preauthorization 132 to the authorization applet 104 of the contactless card 101. In some embodiments, the account application 113 transmits the indication of preauthorization 132 received from the server 120 to the authorization applet 104 of the contactless card 101. In other embodiments, the account application 113 transmits a different indication of preauthorization 132 to the authorization applet 104 of the contactless card 101. The authorization applet 104 may then store the received indication of preauthorization 132 in the memory 102 of the contactless card.

When the user attempts to make a purchase, the user may bring the contactless card 101 in communications range of the communications interface 105-3 of a POS device 140. For example, the user may tap the contactless card 101 to the POS device 140 to communicate wirelessly and/or insert the contactless card into a card reader communications interface 105-3 of the POS device 140. The transaction logic 144 in the memory 142 of the POS device 140 may then transmit transaction data 145 to the contactless card 101. The transaction data 145 may include an amount value for the transaction, a merchant identifier, location data of the POS device 140, a timestamp, and the like. For example, the transaction data 145 may specify that the user is attempting to purchase a $1,000 ring, include a merchant identifier of the jeweler, and location data for the POS device 140 and/or the jeweler. The payment applet 106 may receive the transaction data 145 and request approval from the authorization applet 104 to provide the card data 103 as payment for the transaction.

To determine whether to approve the transaction, the authorization applet 104 may determine whether the rules 107-1 are satisfied by the transaction data 145 and/or the location data received from the mobile device 110 at periodic intervals. For example, if the $1,000 amount of the transaction exceeds a maximum spending amount in the rules 107-1, the authorization applet 104 may decline the approval requested by the payment applet 106. As another example, if the location data received from the mobile device 110 (or the location data in the transaction data 145) is outside the locations specified in the rules 107-1, the authorization applet 104 may decline the approval requested by the payment applet 106. Further still, the authorization applet 104 may determine whether the preauthorization 132 has been received for the transaction. If the preauthorization 132 has been received, the authorization applet 104 may decline the approval requested by the payment applet 106. In some embodiments, the authorization applet 104 determines whether a difference of the timestamp in the transaction data 145 and the timestamp of the preauthorization 132 exceeds a time threshold specified in the rules 107-1. If the difference exceeds the time threshold, the authorization applet 104 may decline the approval requested by the payment applet 106.

Figure 1C:
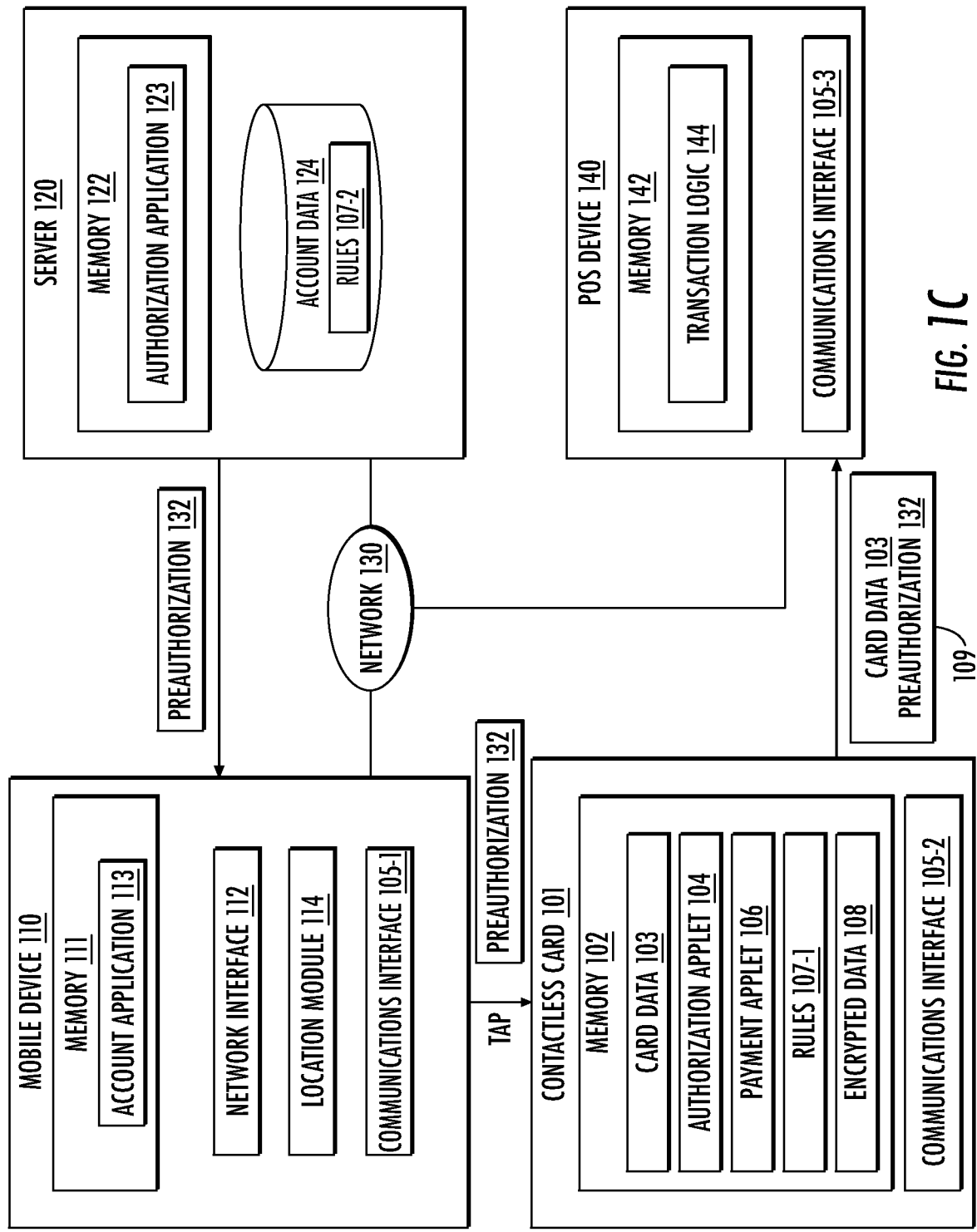

If, however, the authorization applet 104 determines all rules 107-1 are satisfied and/or determines the preauthorization 132 has been received from the server 120, the authorization applet 104 may provide the approval requested by the payment applet 106. FIG. 1C depicts an embodiment where the authorization applet 104 provides the approval requested by the payment applet 106 to the payment applet 106. In response, the payment applet 106 may generate transaction data 109 comprising the card data 103 and an indication of the preauthorization 132. The card data 103 may include a card number (or an account number), an expiration date, and/or card verification value (CVV). In some embodiments, the transaction data 109 is an EMV payload. In such embodiments, the card data 103 is inserted into one or more corresponding fields of the EMV payload, and the indication of the preauthorization 132 is stored in one or more other fields of the EMV payload. For example, the card number may be stored in tag (or field) 5A of an EMV payload and the expiration date may be stored in tag 59 of the EMV payload. In some embodiments, the CVV is not included in the EMV payload. In other embodiments, the CVV is included in one or more other tags of the EMV payload. The indication of preauthorization may be stored in any other tag of the EMV payload, such as discretionary data fields and/or padding data fields of an EMV payload.

Figure 1D:
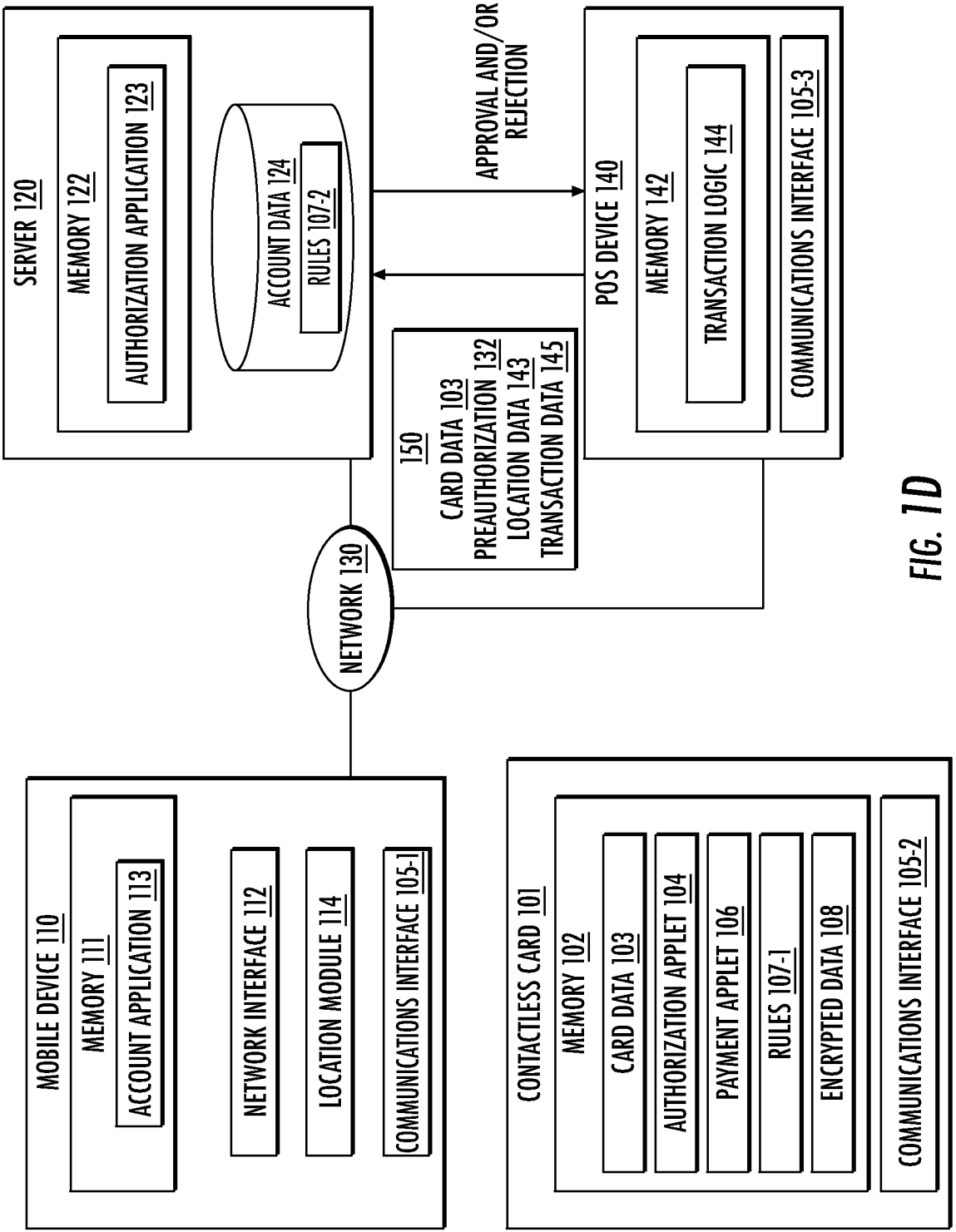

FIG. 1D illustrates an embodiment where the transaction logic 144 of the POS device 140 transmits transaction data 150 to the server 120 via the network 130 to request approval for the requested transaction. As shown, the transaction data 150 may include the card data 103, the preauthorization 132, location data 132 describing a location of the POS device, and the transaction data 145. In at least one embodiment, the transaction data 150 includes the EMV payload generated by the payment applet 106, which includes the card data 103 and the indication of preauthorization 132 in the respective one or more fields of the EMV payload. In some embodiments, the mobile device 110 may transmit at least a portion of the transaction data 150 to the server 120, e.g., requested purchase amount, location of the mobile device 110, etc.) as part of the request for approval of the transaction.

Once received, the authorization application 123 may process the transaction data 150 to determine whether to approve and/or reject the transaction. Generally, the authorization application 123 may attempt to identify the indication of preauthorization 132 in the transaction data 150. If the authorization application 123 identifies the indication of preauthorization 132, the authorization application 123 may compare the received indication of preauthorization 132 (or any attribute thereof) to the indication of preauthorization 132 (or any attribute thereof) stored in the account data 124 for the account associated with the contactless card 101. If the authorization application 123 determines that a matching indication of preauthorization 132 exists in the account data 124 for the account associated with the contactless card 101, the authorization application 123 may approve the transaction, as the preauthorization 132 at least in part reflects the prior validation of the encrypted data 108. If the authorization application 123 determines that a matching indication of preauthorization 132 does not exist in the account data 124 for the account associated with the contactless card 101, the authorization application 123 may decline the transaction. In some embodiments, the authorization application 123 may determine whether the location of the POS device 140 is within a threshold distance of the location data 115 stored as an attribute of the preauthorization 132 in the account data 124. If the location of the POS device 140 is not within the threshold distance of the location data 115, the authorization application 123 may reject the transaction and/or require further processing of the transaction prior to approving the transaction.

In other embodiments, the authorization application 123 may perform additional processing prior to approving and/or declining the transaction. For example, the authorization application 123 may determine whether the transaction amount exceeds any account limits and/or rules 107-2. Similarly, the authorization application 123 may determine whether the time of the transaction is within any time restrictions for using the contactless card 101 in the rules 107-2. Similarly, the authorization application 123 may determine whether the location data of the POS device 140 is within the locations specified in the rules 107-2. In some embodiments, the authorization application 123 may not receive location data from the POS device 140. In such embodiments, the authorization application 123 may determine the location of the POS device 140 based on the merchant identifier and a location associated with the merchant identifier specified in the entry for the merchant in the account data 124. The authorization application 123 may then determine whether the location is within the locations specified in the rules 107-2. Furthermore, the authorization application 123 may perform additional fraud analysis to determine whether to approve the transaction. The authorization application 123 may then transmit an indication of approval and/or denial of the transaction to the POS device 140. The POS device 140 may then transmit an indication of the approval and/or the denial of the transaction to the contactless card 101. Furthermore, the authorization application 123 may transmit indications of additional details related to the approval and/or denial of the transaction to the POS device 140 (e.g., results of any processing performed by the authorization application 123 for the transaction, such as location analysis, analysis based on the rules 107-2, etc.). The POS device 140 may then transmit the received indications to the contactless card 101.

FIG. 2A is a schematic 200 depicting an example embodiment of using the account application 113 on the mobile device 110 to define rules for using a contactless card 101. As shown, the account application 113 outputs a form including fields 201-204, where field 201 corresponds to an amount field, field 202 corresponds to a location field, field 203 corresponds to a time field, and field 204 corresponds to a merchant category field. As shown, the user has provided example values of $300 in the amount field 201, 10 miles from an office in the location field 202, 10 days in the time field 203, and hardware stores in the merchant field 204. Therefore, by providing the values in the fields 201-204, the user specifies that the contactless card 101 can be used to spend up to $300 for 10 days within 10 miles of the office at hardware stores.

FIG. 2B is a schematic 210 illustrating an embodiment where the user submits the values in the fields 201-203. As shown, the account application 113 may output an indication to tap the contactless card 101 to the mobile device 110. Doing so may cause the authorization applet 104 to generate encrypted data 108. The account application 113 may transmit the encrypted data 108 and values from the fields 201-204 (or indications thereof) to the server 120, which may validate the encrypted data 108 and store the received values (or indications thereof) in the rules 107-2 for the corresponding account in the account data. The server 120 may then transmit an indication of the validation of the encrypted data 108 to the account application 113, which may output another indication to tap the contactless card 101 to the mobile device 110. Once tapped, the account application 113 may transmit the values from the fields 201-204 (or indications thereof) to the contactless card 101, which stores the received values in the rules 107-1.

FIG. 3A is a schematic 300 illustrating an example of tapping the contactless card 101 to preauthorize a transaction. As shown, the account application 113 may output an indication to tap the contactless card 101 to the mobile device 110 to preauthorize a transaction after receiving a fingerprint to authenticate the user's account. The user may initiate a request to preauthorize the transaction in the account application 113 to preserve account security.

Once the contactless card 101 is tapped to the mobile device 110, the contactless card 101 may generate encrypted data 108 using the private key, the cryptographic algorithm, and the customer identifier. As stated, in some embodiments, the contactless card 101 may determine whether any data received from the mobile device 110 violates one or more rules 107-1. For example, as shown, the user has specified to preapprove a $100 transaction. If the $100 value exceeds a rule in the rules 107-1, the contactless card 101 may refrain from generating the encrypted data 108, thereby ending the preauthorization process. As another example, if location data received from the mobile device 110 is not within the one or more permitted locations specified in the rules 107-1, the contactless card 101 may refrain from generating the encrypted data 108, thereby ending the preauthorization process.

Once generated, the contactless card 101 may transmit the encrypted data 108 to the account application 113 of the mobile device 110. The account application 113 may transmit the encrypted data 108, location data, and any other data (e.g., requested amount, requested merchant, etc.) to the server 120. The authorization application 123 may then attempt to decrypt the encrypted data 108. If the encrypted data 108 is successfully decrypted to yield the customer ID, the authorization application 123 may then determine whether the location data and any other received data violates any rules in the rules 107-2. For example, if the $100 request exceeds an amount specified in the rules 107-2, the authorization application 123 may refrain from preauthorizing the transaction.

In the example depicted in FIG. 3A, the authorization application 123 preauthorizes the transaction based on decrypting the encrypted data 108 and/or determining that the rules 107-2 are not violated by the request. In response, the authorization application 123 stores an indication of the preauthorization in the account data 124 and transmits an indication of the preauthorization to the account application 113 of the mobile device 110. The stored indication of preauthorization may include one or more attributes, such as the location data received from the mobile device, a timestamp, a transaction amount, etc. The account application 113 may then output another indication to tap the contactless card 101 to the mobile device 110. Doing so may cause the indication of preauthorization to be stored in the memory 102 of the contactless card 101.

FIG. 3B is a schematic 310 depicting an embodiment where the user who has received preauthorization of the transaction in FIG. 3A attempts to make a purchase at a POS device 140 using the contactless card 101. As shown, the user may tap the contactless card 101 to the POS device 140 and/or insert the contactless card 101 in the POS device 140. Doing so causes the payment applet 106 to receive transaction data from the POS device 140. The transaction data may describe an amount of the transaction, a time of the transaction, a merchant identifier associated with the POS device 140, and/or a location of the transaction. The payment applet 106 may then request authorization to proceed with the transaction from the authorization applet 104. The authorization applet 104 may determine to approve the transaction based on the indication of preauthorization stored based on the results of FIG. 3A. The authorization applet 104 may additionally determine whether the transaction data received from the POS device 140 satisfies the rules 107-2 (e.g., whether the merchant identifier corresponds to a permitted class of merchants, the location data corresponds to a permitted location, the amount is a permitted amount, etc.).

The authorization applet 104 may then provide an indication of approval and/or an indication of the preauthorization to the payment applet 106. The payment applet 106 may then generate an EMV payload that includes the card data 103 and the indication of preauthorization. The payment applet 106 may then transmit the EMV payload to the POS device 140. The POS device 140 may then transmit the EMV payload to the server 120. The POS device 140 may further transmit other data to the server 120, such as the transaction data, location data, merchant ID, etc. The server 120 may then approve and/or decline the transaction based at least in part on the indication of preauthorization in the EMV payload. If, for example, the server 120 identifies the indication of preauthorization, the server 120 may approve the transaction. If, however, the indication of preauthorization is expected but not detected in the EMV payload, the server 120 may decline the transaction. The server 120 may further approve and/or decline the transaction based on whether the transaction satisfies and/or violates the rules 107-2.

FIG. 3C is a schematic 320 illustrating an embodiment where the POS device 140 outputs an indication that the server 120 denied the transaction. For example, the server 120 may determine that the location of the POS device 140 and/or the corresponding merchant is outside the geographical regions specified in the rules 107-2 where the contactless card 101 can be used. As another example, the authorization application 123 may determine that the location of the POS device 140 and/or the corresponding merchant is not within a threshold distance of the location data stored as an attribute of the preauthorization 132 in the account data 124. For example, if the location data of the POS device 140 and/or the merchant is 5 miles from the location data in the preauthorization 132, the server 120 may deny the transaction because the user is no longer within a threshold distance (e.g., 100 feet) of the location where the preauthorization was requested. The server 120 may transmit an indication of the denial to the POS device 140, which may output the same for display to the user.

FIG. 3D is a schematic 330 illustrating an embodiment where the POS device 140 outputs an indication that the server 120 approved the transaction based on the preauthorization flag in the EMV payload. As stated, the server 120 may approve the transaction based at least in part on whether the expected indication of preauthorization is present in the EMV payload, and matches a corresponding indication stored in the account data 124 when the transaction was preauthorized. As stated, however, the server 120 may authorize the transaction based on additional factors, such as the rules 107-2 and/or other fraud prevention analyses. Once approved, the server 120 may transmit an indication of the approval to the POS device 140, which may output the same for display to the user.

Figure 4:
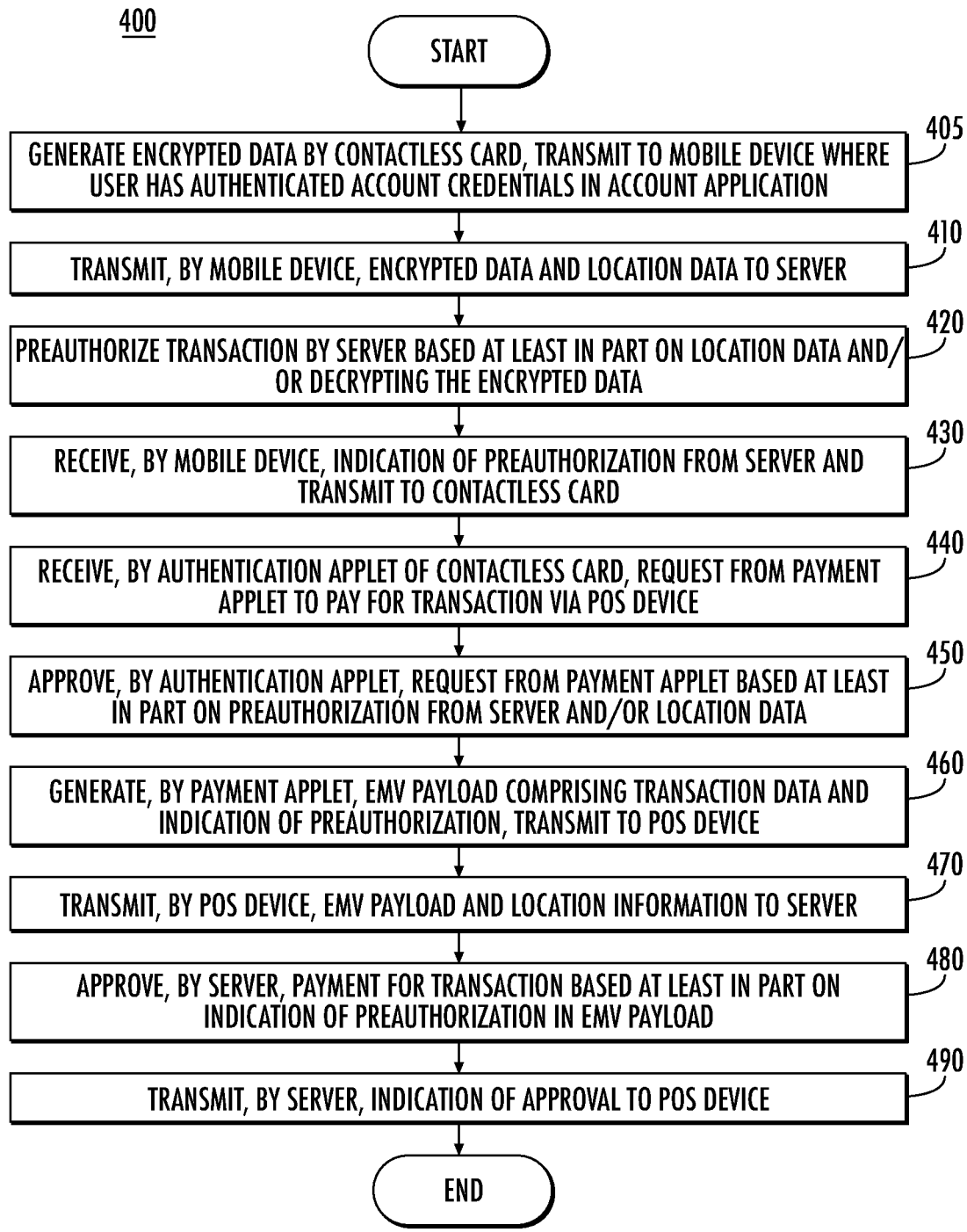
FIG. 4 illustrates an embodiment of a first logic flow.

FIG. 4 illustrates an embodiment of a logic flow 400. The logic flow 400 may be representative of some or all of the operations executed by one or more embodiments described herein. For example, the logic flow 400 may include some or all of the operations to preauthorize a transaction. Embodiments are not limited in this context.

As shown, the logic flow 400 begins at block 405, where the authorization applet 104 generates encrypted data 108 using a private key, input data (e.g., a customer identifier), and a cryptographic algorithm. The authorization applet 104 may transmit the encrypted data 108 to the account application 113 executing on a mobile device 110. In one embodiment, the authorization applet 104 generates the encrypted data 108 responsive to a user requesting preauthorization after the user has provided authentication credentials for their account in the account application 113. At block 410, the account application 113 transmits the encrypted data 108 and location data received from the location module 114 to the server 120 via the network 130. As stated, the location data received from the location module 114 may describe the location of the mobile device 110. In some embodiments, the account application 113 may transmit additional data to the server 120, such as a requested amount for the preauthorization, a merchant for the preauthorization, a duration for the preauthorization, and/or a merchant category for the preauthorization.

At block 420, the authorization application 123 may preauthorize the transaction based at least in part on the received location data and/or decrypting the encrypted data 108. For example, the authorization application 123 may determine whether the received location data is within one or more permitted locations to use the contactless card 101 specified in the rules 107-2. The authorization application 123 may further attempt to decrypt the encrypted data 108 using the private key associated with the contactless card 101. In one embodiment, the authorization application 123 may preauthorize the transaction based on decrypting the encrypted data 108 and determining that the location data is within the one or more locations for using the contactless card 101 specified in the rules 107-2. In another embodiment, the authorization application 123 may preauthorize the transaction based on decrypting the encrypted data 108 or determining that the location data is within the one or more locations for using the contactless card 101 specified in the rules 107-2. In some embodiments, the authorization application 123 may additionally determine whether the preauthorization request satisfies the rules 107-2, e.g., whether the requested amount, merchant, duration, and/or merchant category satisfy one or more corresponding rules in the rules 107-2. As stated, in some embodiments, the authorization application 123 may select a level of preauthorization from a plurality of levels of preauthorization. In other embodiments, the authorization application 123 may return a binary preauthorization result (e.g., preauthorized and/or not preauthorized). The authorization application 123 may then store an indication of the preauthorization in the account data 124 for the account. As stated, the stored indication of the preauthorization may include attributes such as the level of preauthorization, the time of the preauthorization, the location data received from the mobile device, etc.

At block 430, the account application 113 of the mobile device 110 may receive an indication of the preauthorization from the server 120. The account application 113 may then transmit the indication of preauthorization to the contactless card 101 which stores the indication of preauthorization in the memory 102. At block 440, the authorization applet 104 may receive a request to approve a transaction from the payment applet 106. Generally, the payment applet 106 may receive transaction data from a POS device 140 indicating attributes such as a transaction amount, merchant ID, location data, timestamp, etc.

At block 450, the authorization applet 104 approves the request from the payment applet based at least in part on the preauthorization by the server 120 and/or the location of the mobile device 110 (and/or the POS device 140). The authorization applet 104 may approve and/or decline the request based at least in part on the presence of the indication of preauthorization stored in the memory 102. For example, the authorization applet 104 may determine if the location associated with the indication of preauthorization is within a threshold distance of the latest location data received from the mobile device 110 and/or location data received from the POS device 140. Additionally and/or alternatively, the authorization applet 104 may determine whether the transaction amount and/or the time received from the POS device 140 violate amount and/or time rules in the rules 107-2. Additionally and/or alternatively, the authorization applet 104 may determine whether the merchant ID received from the POS device 140 violates merchant and/or merchant category rules in the rules 107-2.

At block 460, the payment applet 106 generates an EMV payload comprising transaction data and an indication of the preauthorization. The transaction data may include the card number, expiration date, and CVV value of the contactless card 101. The payment applet 106 may transmit the EMV payload to the POS device 140. At block 470, the POS device transmits the EMV payload and transaction data to the server 120 to request approval of payment for the transaction using the contactless card 101. The transaction data may include a transaction amount, merchant identifier, and/or location data of the POS device 140. In some embodiments, the account application 113 may also transmit data (e.g., requested amount, location information, time information) to the server 120 for approval. At block 480, the authorization application 123 of the server 120 approves payment for the transaction using the contactless card 101 based at least in part on the indication of the preauthorization in the EMV payload. For example, the authorization application 123 may determine that the location data in the stored indication of preauthorization in the account data 124 is within a threshold distance of the location of the POS device 140. Additionally and/or alternatively, the authorization application 123 may determine that the attributes of the transaction do not violate any rules 107-2 for using the contactless card 101. At block 490, the authorization application 123 transmits an indication of approval of the transaction to the POS device 140, which may output an indication of approval and further process the transaction.

Figure 5:
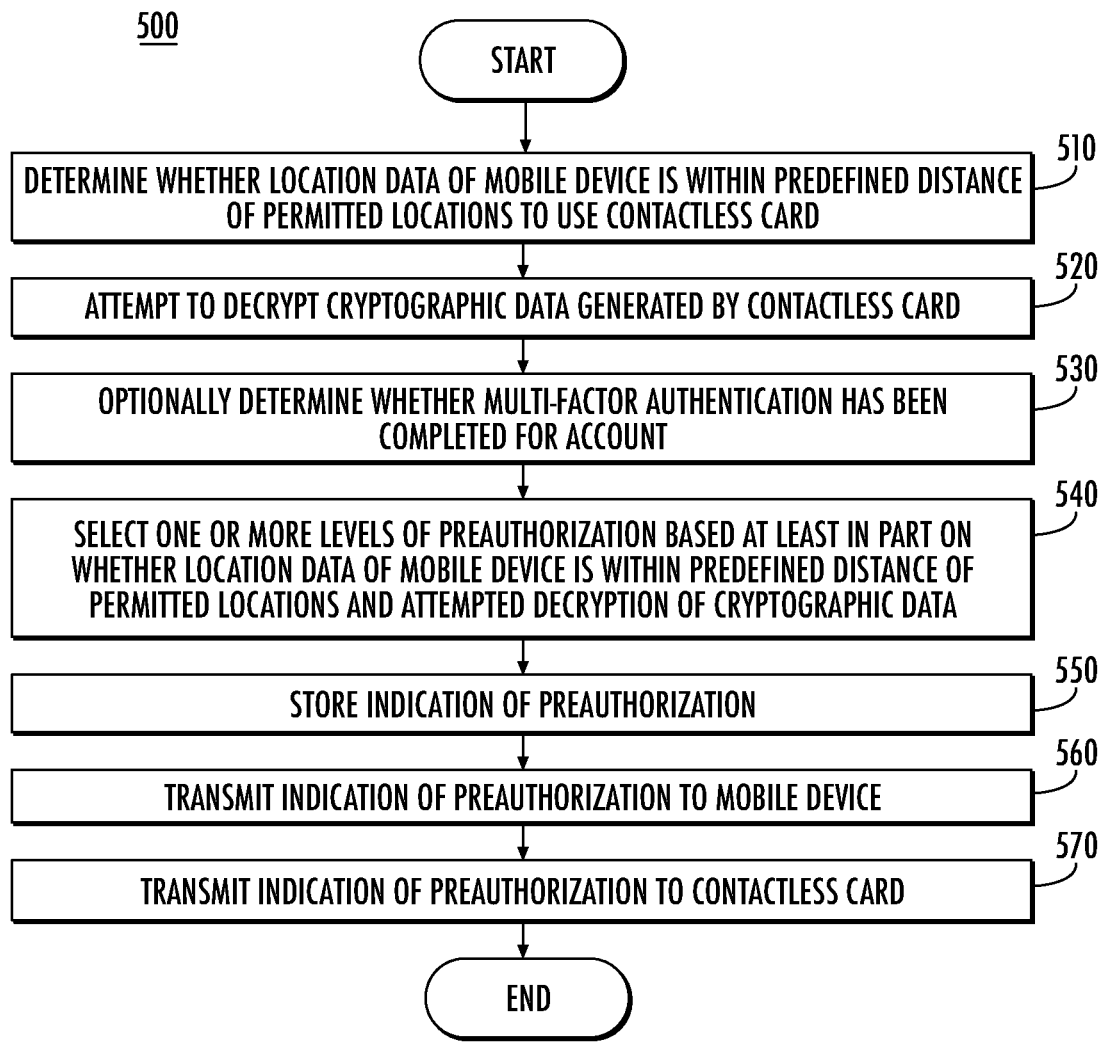
FIG. 5 illustrates an embodiment of a second logic flow.

FIG. 5 illustrates an embodiment of a logic flow 500. The logic flow 500 may be representative of some or all of the operations executed by one or more embodiments described herein. For example, the logic flow 500 may include some or all of the operations performed by the authorization application 123 to preauthorize a transaction. Embodiments are not limited in this context.

As shown, the logic flow 500 begins at block 510, where the authorization application 123 determines whether the location data received from the mobile device 110 is within one or more locations specified in the rules 107-2 as being permitted to use the contactless card 101. In some embodiments, the authorization application 123 determines whether the location data is within a threshold distance of the one or more locations specified in the rules 107-2. At block 520, the authorization application 123 attempts to decrypt the encrypted data 108 generated by the contactless card 101, e.g., using a copy of the private key associated with the contactless card 101. At block 530, the authorization application 123 determines whether multi-factor authentication has been completed for the account. For example, the authorization application 123 may determine to preauthorize transactions based at least in part on whether multi-factor authentication was used to authenticate the user in their account in the account application 113.

At block 540, the authorization application 123 may select one or more levels of preauthorization for the transaction based at least in part on the result of the attempted decryption of the encrypted data 108 and/or whether the location data received from the mobile device 110 is within one or more locations specified in the rules 107-2. Additionally and/or alternatively, the authorization application 123 may select the preauthorization levels based on whether multi-factor authentication was completed and/or whether any rules 107-2 are violated by the requested preauthorization. At block 550, the authorization application 123 may store an indication of the selected level of preauthorization. In some embodiments, the level of preauthorization is a binary preauthorization (e.g., preauthorized and/or not preauthorized). In one embodiment, the indication of preauthorization comprises a unique identifier for the preauthorization. The indication of preauthorization may further include the location data received from the mobile device, the requested preauthorization amount, and/or a timestamp.

At block 560, the authorization application 123 may transmit an indication of the preauthorization to the mobile device 110. The transmitted indication may be the same as the indication stored in the account data 124 and/or a different indication. For example, the authorization application 123 may transmit the unique identifier of the preauthorization. At block 570, the account application 113 transmits the indication of preauthorization received from the authorization application 123 to the contactless card 101. The contactless card 101 may then store the received indication of preauthorization to include in EMV payloads generated by the contactless card 101 to pay for transactions via a POS device 140. Doing so allows the authorization application 123 to identify the indication of preauthorization in the EMV payloads and compare the received indication (or attributes thereof) to the indication of preauthorization stored in the account data 124 (or attributes thereof).

Figure 6:
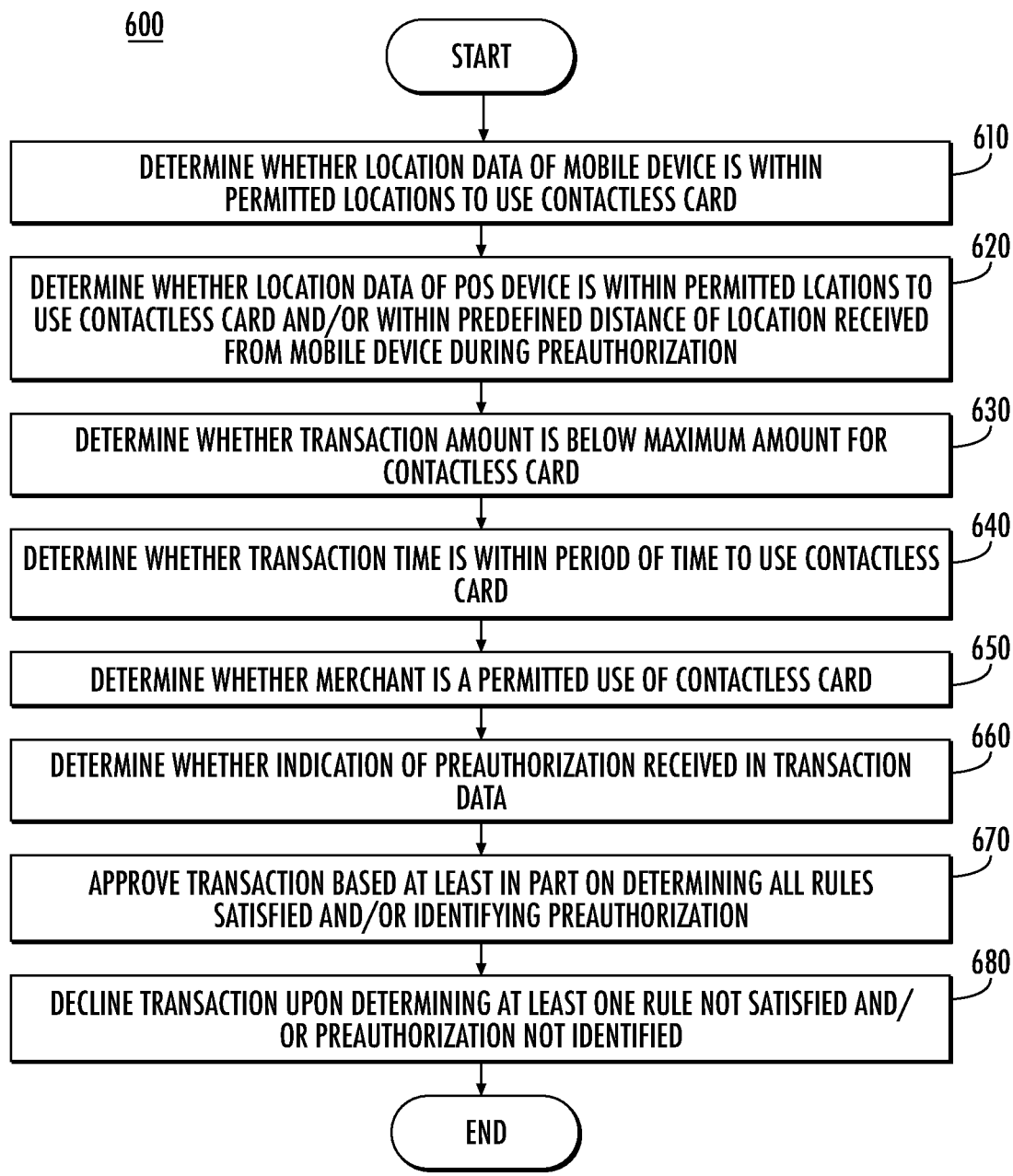
FIG. 6 illustrates an embodiment of a third logic flow.

FIG. 6 illustrates an embodiment of a logic flow 600. The logic flow 600 may be representative of some or all of the operations executed by one or more embodiments described herein. For example, the logic flow 600 may include some or all of the operations performed by the authorization application 123 to constrain the transactional capabilities of a contactless card. Embodiments are not limited in this context. For example, the authorization applet 104 may perform some or all of the operations of the logic flow 600 when determining whether to generate encrypted data 108 and/or approve a request from the payment applet 106 to pay for a transaction using the contactless card.

As shown, the logic flow 600 begins at block 610, where the authorization application 123 may determine whether location data received from the mobile device 110 is within one or more permitted locations to use the contactless card 101 (and/or within a threshold distance thereof). As stated, the permitted locations to use the contactless card 101 may be stored in the rules 107-2. At block 620, the authorization application 123 may determine whether location data provided by the POS device 140 is within one or more permitted locations to use the contactless card 101. Additionally and/or alternatively, the authorization application 123 may determine whether the location data provided by the POS device 140 is within a predefined distance of the location data received from the mobile device 110 as part of a preauthorization request.

At block 630, the authorization application 123 may determine whether a transaction amount for a requested transaction is below a maximum amount specified in the rules 107-1 and/or the rules 107-2 for using the contactless card. At block 640, the authorization application 123 may determine whether a time of the transaction is within one or more periods of time the contactless card 101 is permitted for use (e.g., based on the rules 107-2 and/or the rules 107-2). At block 650, the authorization application 123 may determine whether a merchant associated with the transaction is a permitted use of the contactless card 101. As stated, the 107-2 may specify permitted merchant identifiers and/or merchant categories. If the merchant identifier associated with the transaction is not a permitted merchant identifier and/or not within a permitted merchant category, the server 120 and/or the contactless card 101 may restrict use of the contactless card 101. At block 660, the authorization application 123 may determine whether an indication of preauthorization is stored in the EMV payload received from the POS device 140. In some embodiments, the authorization application 123 may compare the indication of preauthorization (or an attribute thereof) to one or more stored indications of preauthorization for the account in the account data. Furthermore, the authorization application 123 may determine whether any rules associated with the indication of preauthorization are violated. For example, the preauthorization may be limited in time, distance (e.g., relative to the location data received from the mobile device 110 when the preauthorization was processed), etc.

At block 670, the authorization application 123 may approve the transaction based at least in part on determining all rules 107-2 are satisfied and/or identifying the indication of preauthorization in the EMV payload. At block 680, the authorization application 123 may decline the transaction based at least in part on determining at least one rule 107-2 is not satisfied and/or failing to identify the indication of preauthorization in the EMV payload. Similarly, if the location data associated with the indication of preauthorization is not within a threshold distance of the POS device 140 providing the EMV payload, the authorization application 123 may decline the transaction.

Figure 7:
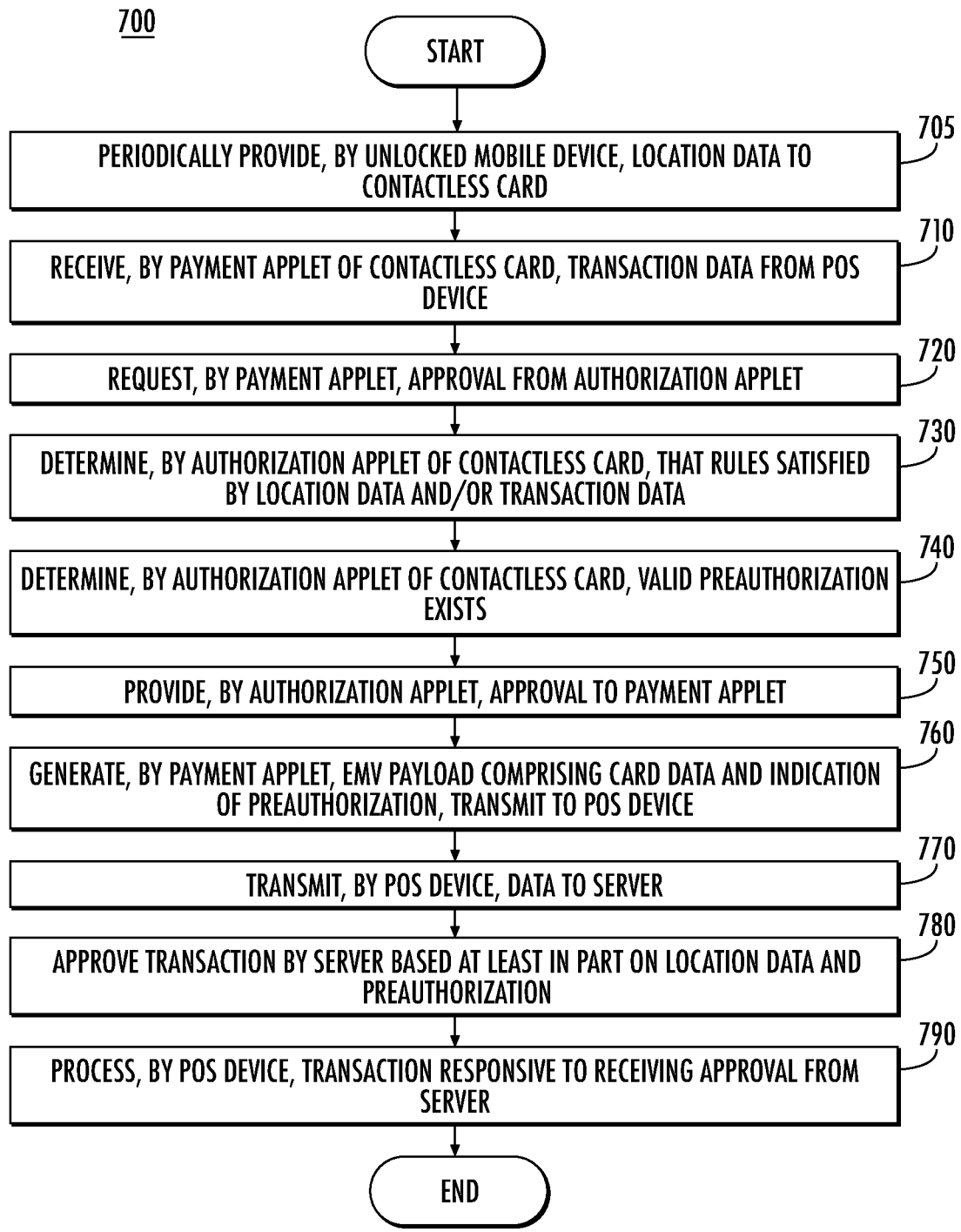
FIG. 7 illustrates an embodiment of a fourth logic flow.

FIG. 7 illustrates an embodiment of a logic flow 700. The logic flow 700 may be representative of some or all of the operations executed by one or more embodiments described herein. For example, the logic flow 700 may include some or all of the operations to constrain the transactional capabilities of a contactless card. Embodiments are not limited in this context.

As shown, the logic flow 700 begins at block 705, where the location module 114 of an unlocked mobile device 110 provides location data to the account application 113. The account application 113 may, in turn, transmit the location data to the contactless card 101. At block 710, the payment applet 106 of the contactless card 101 may receive transaction data (e.g., a transaction amount, merchant ID, location data, etc.) from a POS device 140. At block 720, the payment applet 106 requests approval for the transaction from the authorization applet 104. At block 730, the authorization applet 104 determines that the rules 107-1 are satisfied by the transaction data, including the transaction amount, location of the POS device 140, and/or the merchant ID. At block 740, the authorization applet 104 determines that a valid indication of preauthorization is stored in the memory 102. For example, the authorization applet 104 may determine that a time associated with the preauthorization is within a time threshold specified in the rules 107-1. As another example, the authorization applet 104 may determine that the location data associated with the indication of preauthorization is within a threshold distance of the location data of the POS device 140.

At block 750, the authorization applet 104 provides the approval to the payment applet 106 based at least in part on the determinations made at blocks 730 and 740. At block 760, the payment applet 106 generates an EMV payload comprising the account number, expiration date, CVV, and indication of preauthorization. The payment applet 106 may then transmit the EMV payload to the POS device 140. At block 770, the POS device 140 transmits the EMV payload, transaction data, and location data of the POS device 140 to the authorization application 123 of the server 120.

At block 780, the authorization application 123 approves the transaction based at least in part on detecting the indication of preauthorization in the EMV payload and/or the location data received from the POS device 140. For example, the authorization application 123 may determine whether location data provided by the POS device 140 is within one or more permitted locations to use the contactless card 101. Additionally and/or alternatively, the authorization application 123 may determine whether the location data provided by the POS device 140 is within a predefined distance of the location data of the indication of preauthorization stored in the account data 124. The authorization application 123 may then transmit an indication of approval.

At block 790, the POS device 140 may process the transaction responsive to receiving the indication of approval from the authorization application 123.

Figure 8:
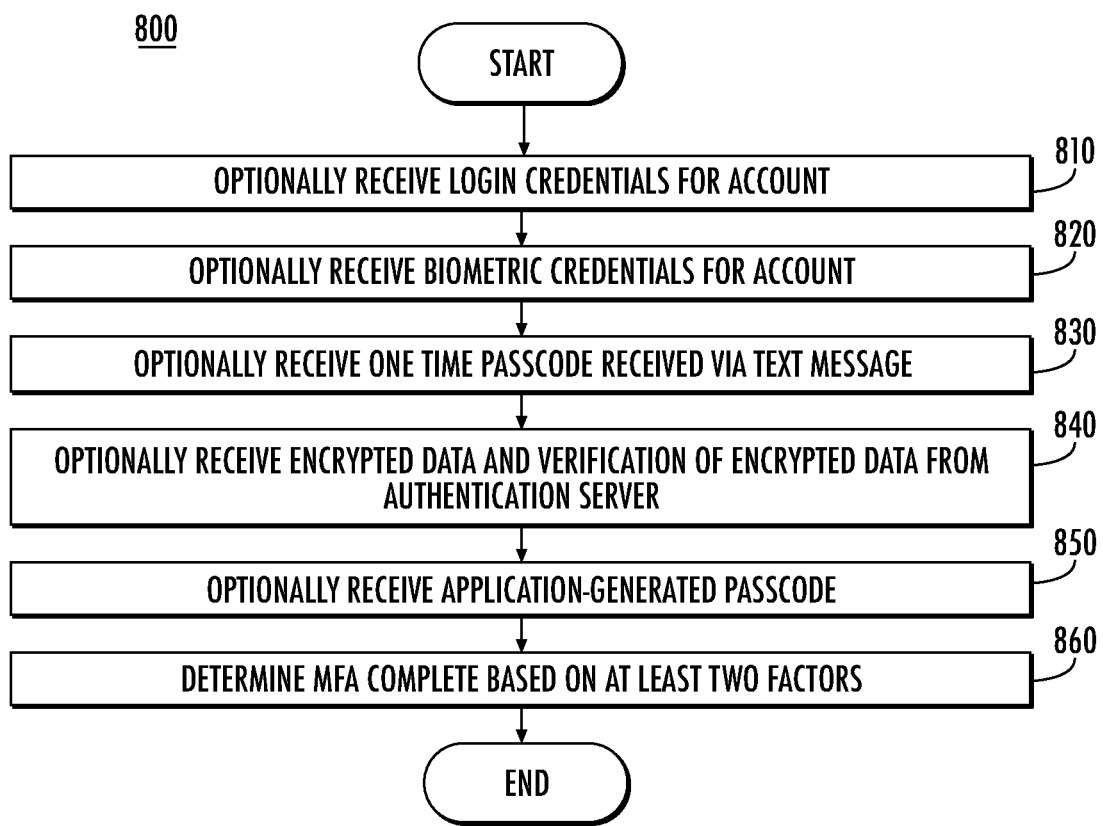
FIG. 8 illustrates an embodiment of a fifth logic flow.

FIG. 8 illustrates an embodiment of a logic flow 800. The logic flow 800 may be representative of some or all of the operations executed by one or more embodiments described herein. For example, the logic flow 800 may include some or all of the operations performed to determine multi-factor authentication has been performed for an account. Embodiments are not limited in this context.

As shown, the logic flow 800 begins at block 810, where the account application 113 optionally receives valid login credentials (e.g., a username and password) for an account. At block 820, the account application 113 optionally receives biometric credentials (e.g., iris scan, fingerprints, Face ID, etc.) for the account. At block 830, the account application 113 optionally receives a one-time passcode transmitted by the server 120 to the phone number of the mobile device 110 in a text message. At block 840, the account application 113 optionally receives encrypted data 108 generated by the contactless card 101 and transmits the encrypted data 108 to the server 120. The server 120 may decrypt the encrypted data 108 to verify the encrypted data 108 and transmit an indication of the verification to the account application 113. At block 850, the account application 113 optionally receive a passcode generated by a different application and provided by the user as input to the account application 113. At block 860, the account application 113 may determine multi-factor authentication for the account has occurred based on at least two of the authentication factors in blocks 810-850. For example, if the login credentials are received at block 810 and the biometric credentials are received at 820, the account application 113 may determine multi-factor authentication for the account has been completed. The account application 113 may transmit an indication of the multi-factor authentication for the account to the server 120.

Figure 9:
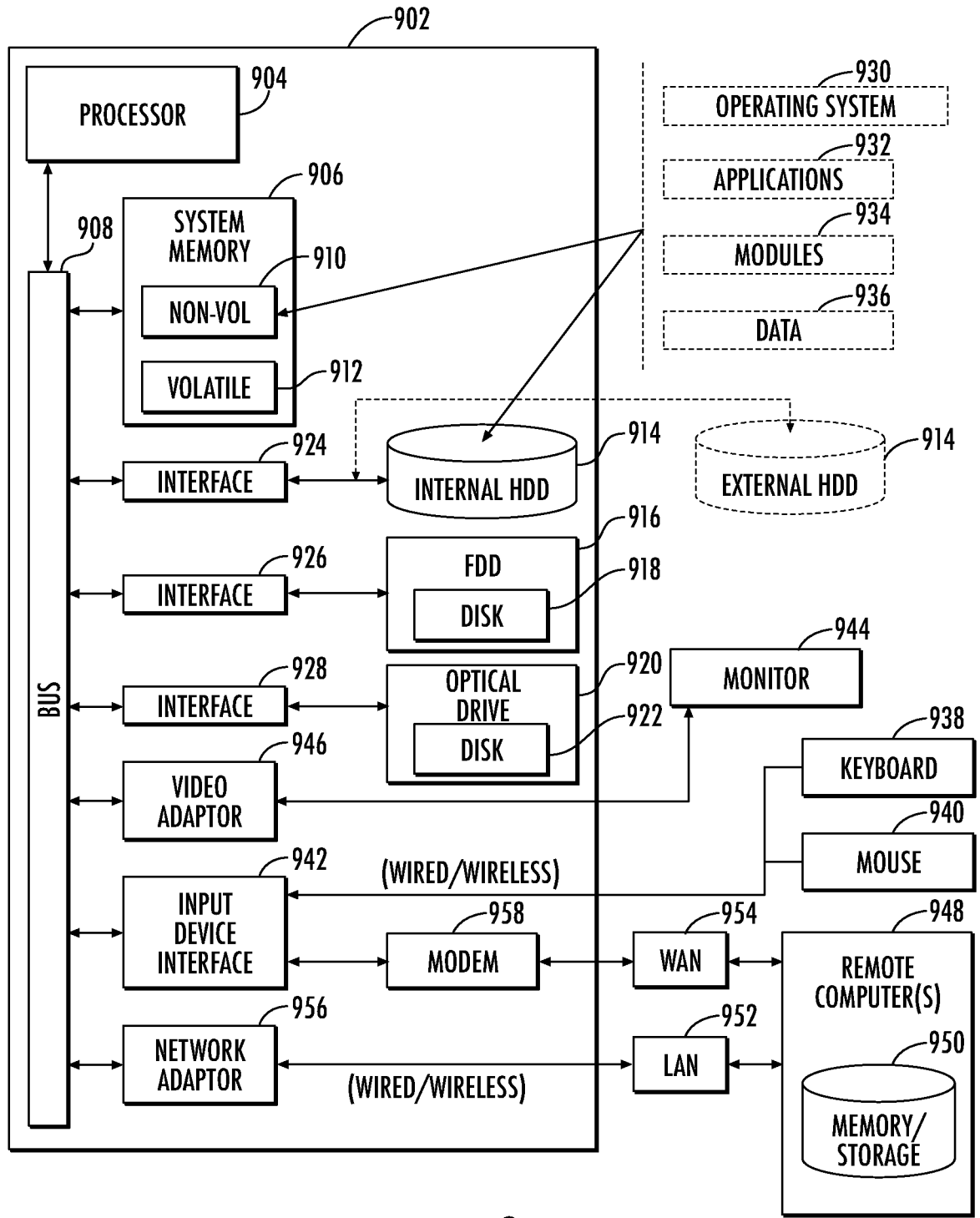
FIG. 9 illustrates an embodiment of a computing architecture.

FIG. 9 illustrates an embodiment of an exemplary computing architecture 900 comprising a computing system 902 that may be suitable for implementing various embodiments as previously described. In various embodiments, the computing architecture 900 may comprise or be implemented as part of an electronic device. In some embodiments, the computing architecture 900 may be representative, for example, of a system that implements one or more components of the system 100. In some embodiments, computing system 902 may be representative, for example, of the contactless card 101, mobile devices 110, server 120, and/or the POS devices 140 of the system 100. The embodiments are not limited in this context. More generally, the computing architecture 900 is configured to implement all logic, applications, systems, methods, apparatuses, and functionality described herein with reference to FIGS. 1-8.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 902.

As shown in FIG. 9, the computing system 902 comprises a processor 904, a system memory 906 and a system bus 908. The processor 904 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 904.

The system bus 908 provides an interface for system components including, but not limited to, the system memory 906 to the processor 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computing system 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies. The computing system 902 is generally is configured to implement all logic, systems, methods, apparatuses, and functionality described herein with reference to FIGS. 1-8.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100, e.g., the card data 103, authorization applet 104, payment applet 106, rules 107, encrypted data 108, account application 113, the authorization application 123, account data 124, and/or the transaction logic 144.

A user can enter commands and information into the computing system 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computing system 902. In addition to the monitor 944, a computer typically includes other peripheral output devices, such as speakers, printers, and so forth.

The computing system 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computing system 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 952 and the WAN 954.

When used in a LAN networking environment, the computing system 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956. The network interface 112 of the mobile device 110 is an example of the adaptor 956.

When used in a WAN networking environment, the computing system 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computing system 902, or portions thereof, can be stored in the remote memory/storage device 950. It will be appreciated that the network connections shown are exemplary and other means of establishing a communications link between the computers can be used.

The computing system 902 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10A:
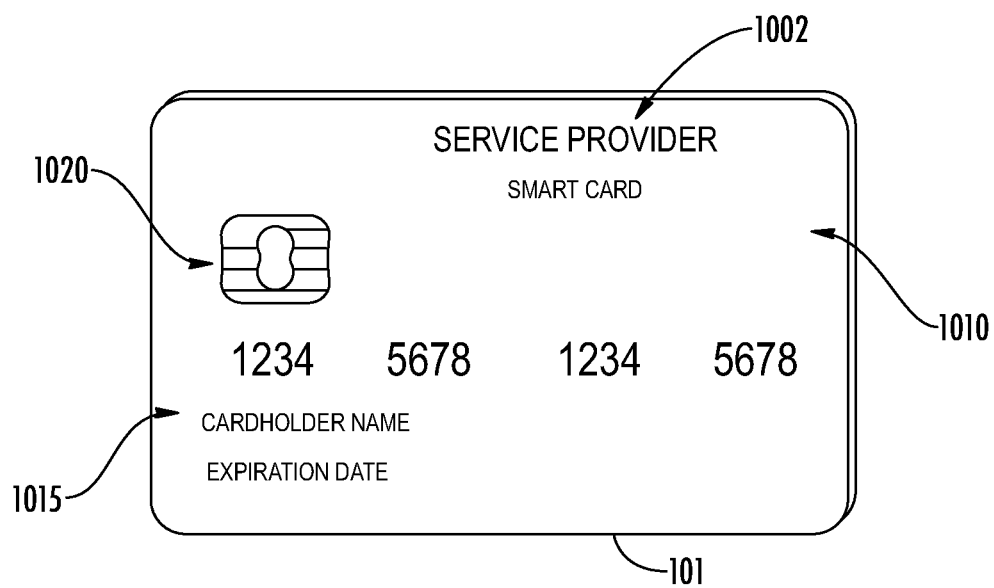
FIGS. 10A-10B illustrate an example contactless card.

FIG. 10A illustrates a contactless card 101, which may comprise a payment card, such as a credit card, debit card, and/or a gift card. As shown, the contactless card 101 may be issued by a service provider 1002 displayed on the front or back of the card 101. In some examples, the contactless card 101 is not related to a payment card, and may comprise, without limitation, an identification card. In some examples, the payment card may comprise a dual interface contactless payment card. The contactless card 101 may comprise a substrate 1010, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

The contactless card 101 may also include identification information 1015 displayed on the front and/or back of the card, and a contact pad 1020. The contact pad 1020 may be configured to establish contact with another communication device, such as the mobile devices 110, a user device, smart phone, laptop, desktop, or tablet computer. The contactless card 101 may also include processing circuitry, antenna and other components not shown in FIG. 10A. These components may be located behind the contact pad 1020 or elsewhere on the substrate 1010. The contactless card 101 may also include a magnetic strip or tape, which may be located on the back of the card (not shown in FIG. 10A).

Figure 10B:
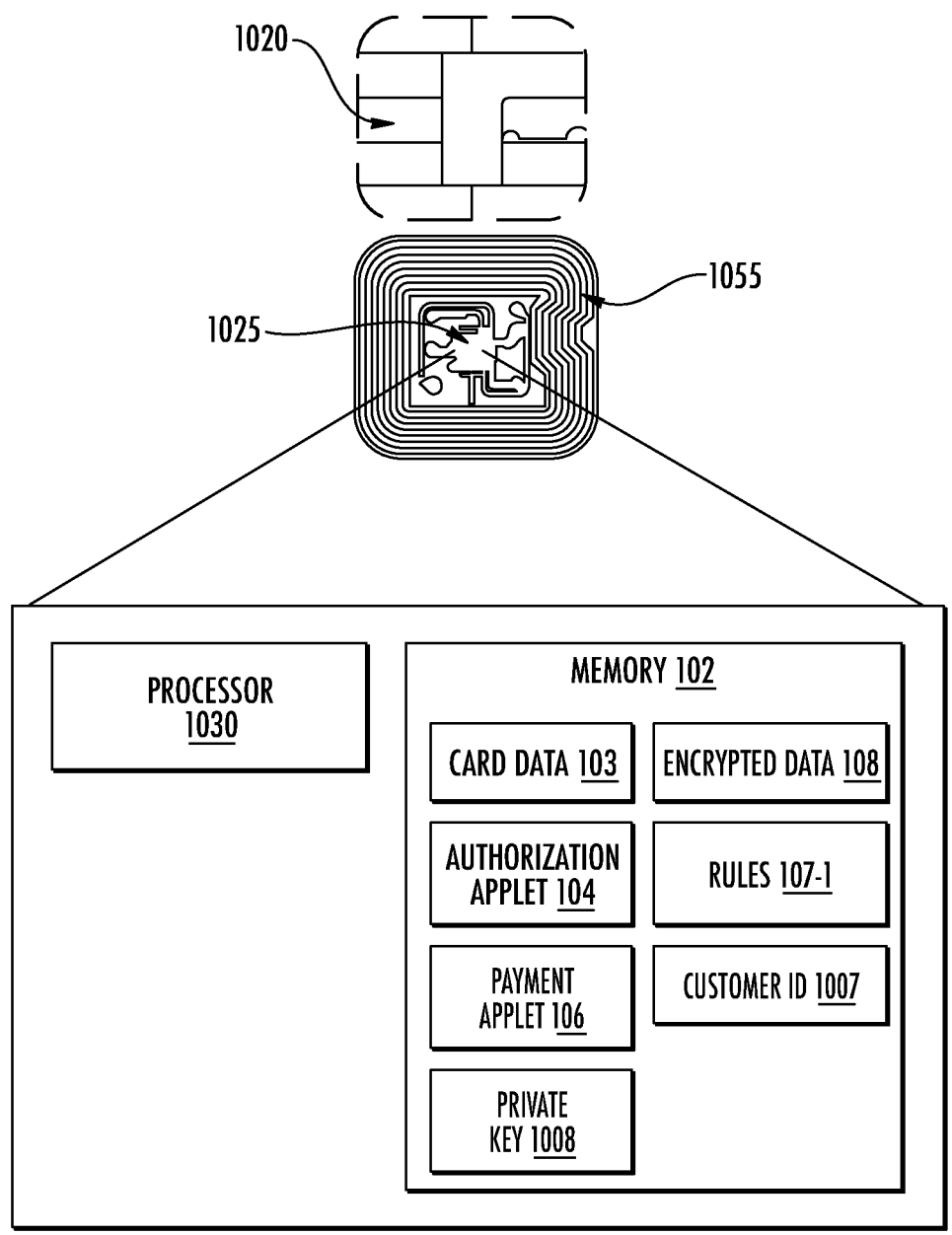

As illustrated in FIG. 10B, the contact pad 1020 of contactless card 101 may include processing circuitry 1025 for storing and processing information, including a microprocessor 1030 and the memory 102. It is understood that the processing circuitry 1025 may contain additional components, including processors, memories, error and parity/CRC checkers, data encoders, anti-collision algorithms, controllers, command decoders, security primitives and tamper proofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. A read/write memory may also be read many times after leaving the factory.

The memory 102 may be configured to store the card data 103, one or more applets (including the authorization applet 104, the payment applet 106, and any other applet), a private key 1008, the encrypted data 108, the rules 107-1, and one or more customer (or user) identifiers (IDs) 1007. The one or more applets 103 may comprise one or more software applications configured to execute on one or more contactless cards, such as a Java® Card applet. However, it is understood that applets 103 are not limited to Java Card applets, and instead may be any software application operable on contactless cards or other devices having limited memory. The customer ID 1007 may comprise a unique alphanumeric identifier assigned to a user of the contactless card 101, and the identifier may distinguish the user of the contactless card from other contactless card users. In some examples, the customer ID 1007 may identify both a customer and an account assigned to that customer and may further identify the contactless card associated with the customer's account. In some embodiments, the authorization applet 104 (or a different applet) may use the customer ID 1007 as input to a cryptographic algorithm with the private key 1008 to generate the encrypted data 108.

The processor and memory elements of the foregoing exemplary embodiments are described with reference to the contact pad, but the present disclosure is not limited thereto. It is understood that these elements may be implemented outside of the pad 1020 or entirely separate from it, or as further elements in addition to processor 1030 and memory 102 elements located within the contact pad 1020.

In some examples, the contactless card 101 may comprise one or more antennas 1055. The one or more antennas 1055 may be placed within the contactless card 101 and around the processing circuitry 1025 of the contact pad 1020. For example, the one or more antennas 1055 may be integral with the processing circuitry 1025 and the one or more antennas 1055 may be used with an external booster coil. As another example, the one or more antennas 1055 may be external to the contact pad 1020 and the processing circuitry 1025.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the contactless card's power connection, which may be functionally maintained through one or more capacitors. The contactless card 101 may communicate back by switching a load on the contactless card's coil or load modulation. Load modulation may be detected in the terminal's coil through interference. More generally, using the antennas 1055, processing circuitry 1025, and/or the memory 102, the contactless card 101 provides a communications interface to communicate via NFC, Bluetooth, and/or Wi-Fi communications.

As explained above, contactless cards 101 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader (e.g., the communications interface 105-1 of the device 110), and produce an NDEF message that comprises a cryptographically secure OTP encoded as an NDEF text tag.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A non-transitory computer-readable storage medium storing executable computer-readable program code that when executed by a processor causes the processor to perform the steps of:

receiving a request from an account application of a mobile device, the request comprising encrypted data and location data, the location data associated with the mobile device;

decrypting the encrypted data using a cryptographic algorithm and a key, wherein the key is associated with a contactless card;

determining, based on one or more rules associated with an account and the decryption of the encrypted data, that the location data is within a threshold distance of one or more locations the contactless card is permitted for use;

preauthorizing a transaction based on the decryption of the encrypted data and the determination that the location data is within the threshold distance of the one or more locations the contactless card is permitted for use;

selecting a first level of preauthorization for the transaction from a plurality of levels of preauthorization based on the decryption of the encrypted data and the determination that the location data is within the threshold distance of the one or more locations the contactless card is permitted for use;

storing an indication of the preauthorization for the transaction, the indication comprising: (i) the first level of preauthorization, (ii) a timestamp of the preauthorization, and (iii) the location data, wherein the indication of the preauthorization is one of a plurality of indications of preauthorization, wherein each indication of preauthorization is for a respective transaction of a plurality of transactions including the transaction, wherein each indication of preauthorization further comprises a unique identifier of the respective indication of preauthorization;

transmitting, to the account application, the indication of the preauthorization for the transaction;

receiving, from a point of sale (POS) device, transaction data comprising: (i) an indication of an account number of the contactless card, (ii) an indication of an expiration date of the contactless card, and (iii) the indication of the preauthorization of the transaction, wherein the indication of the preauthorization of the transaction is received by the POS device from the contactless card, wherein the transaction data comprises an EMV payload;

identifying the indication of the preauthorization of the transaction in a first field of the EMV payload;

identifying the indication of the account number, the indication of the expiration date, and an indication of a card verification value (CVV) in one or more other fields of the EMV payload;

determining that the unique identifier of the indication of the preauthorization of the transaction in the EMV payload matches the unique identifier of the stored indication of the preauthorization for the transaction; and approving the transaction based at least in part on the determination that the unique identifier of the indication of the preauthorization of the transaction in the EMV payload matches the unique identifier of the stored indication of the preauthorization for the transaction.

2. The non-transitory computer-readable storage medium of claim 1, the computer-readable program code that when executed by the processor to cause the processor to perform the steps of:

comparing the unique identifier of the stored indication of the preauthorization of the transaction to the unique identifier of the indication of the preauthorization of the transaction in the first field of the EMV payload; and determining, based on the comparison, that the unique identifier of the stored indication of the preauthorization of the transaction matches the unique identifier of the indication of the preauthorization of the transaction in the first field of the EMV payload.

3. The non-transitory computer-readable storage medium of claim 2, the computer-readable program code that when executed by the processor to cause the processor to perform the step of:

prior to storing the indication of the preauthorization for the transaction, selecting a second level of preauthorization of the plurality of levels of preauthorization for the transaction based on: (i) completion of multi-factor authentication for the account and (ii) the one or more rules, wherein the stored indication of the preauthorization for the transaction comprises the second level of preauthorization.

4. The non-transitory computer-readable storage medium of claim 3, the non-transitory computer-readable storage medium the computer-readable program code that when executed by the processor to cause the processor to perform the steps of:
determining, that the location data is within the threshold distance of a location of the POS device; and
transmitting an indication of approval for the transaction to the POS device.

5. The non-transitory computer-readable storage medium of claim 3, the computer-readable program code that when executed by the processor to cause the processor to perform the steps of the steps of:
receiving a current time associated with the transaction;
determining a time difference between the current time and the timestamp of the preauthorization; and
determining, based on the one or more rules associated with the account, that the time difference is within a threshold amount of time, wherein the transaction is further approved based on the determination that the time difference is within the threshold amount of time.

6. The non-transitory computer-readable storage medium of claim 1, the computer-readable program code that when executed by the processor to cause the processor to perform the steps of:
receiving, from the POS device, an indication of an amount of the transaction; and
determining, based on the one or more rules associated with the account, that the amount of the transaction is less than a maximum spend amount.

7. A method, comprising:
receiving, by a server, a request from an account application of a mobile device, the request comprising encrypted data and location data, the location data associated with the mobile device;
decrypting, by the server, the encrypted data using a cryptographic algorithm and a key, wherein the key is associated with a contactless card;
determining, by the server based on one or more rules associated with an account and the decryption of the encrypted data, that the location data received is within a threshold distance of one or more locations the contactless card is permitted for use;
preauthorizing, by the server, a transaction based on the decryption of the encrypted data and the determination that the location data is within the threshold distance of the one or more locations the contactless card is permitted for use;
selecting, by the server, a first level of preauthorization for the transaction from a plurality of levels of preauthorization based on the decryption of the encrypted data and the determination that the location data is within the threshold distance of the one or more locations the contactless card is permitted for use;
storing, by the server, an indication of the preauthorization for the transaction, the indication comprising: (i) the first level of preauthorization, (ii) a timestamp of the preauthorization, and (iii) the location data, wherein the indication of the preauthorization is one of a plurality of indications of preauthorization, wherein each indication of pre authorization is for a respective transaction of a plurality of transactions including the transaction, wherein each indication of preauthorization further comprises a unique identifier of the respective indication of preauthorization;
transmitting, by the server to the account application, the indication of the preauthorization for the transaction;
receiving, by the server from a point of sale (POS) device, transaction data comprising: (i) an indication of an account number of the contactless card, (ii) an indication of an expiration date of the contactless card, and (iii) the indication of the preauthorization of the transaction, wherein the indication of the preauthorization of the transaction is received by the POS device from the contactless card, wherein the transaction data comprises an EMV payload;
identifying, by the server, the indication of the preauthorization of the transaction in a first field of the EMV payload;
identifying, by the server, the indication of the account number, the indication of the expiration date, and an indication of a card verification value (CVV) in one or more other fields of the EMV payload;
determining, by the server, that the unique identifier of the indication of the pre authorization of the transaction in the EMV payload matches the unique identifier of the stored indication of the preauthorization for the transaction; and
approving the transaction by the server based at least in part on the determination that the unique identifier of the indication of the preauthorization of the transaction in the EMV payload matches the unique identifier of the stored indication of the preauthorization for the transaction.

8. The method of claim 7, wherein the plurality of levels of preauthorization are distinct from the account number of the contactless card.

9. The method of claim 8, wherein approving the transaction further comprises:
comparing, by the server, the unique identifier of the stored indication of the preauthorization of the transaction to the unique identifier of the indication of the preauthorization of the transaction in the first field of the EMV payload;
determining, by the server based on the comparison, that the unique identifier of the stored indication of the preauthorization of the transaction matches the unique identifier of the indication of the preauthorization of the transaction in the first field of the EMV payload;
comparing, by the server, the first level of authorization of the stored indication of the preauthorization of the transaction to the first level of authorization of the indication of the preauthorization of the transaction in the first field of the EMV payload; and
determining, by the server based on the comparison, that the first level of authorization of the stored indication of the preauthorization of the transaction matches the first level of authorization of the indication of the preauthorization of the transaction in the first field of the EMV payload.

10. The method of claim 9, further comprising:
prior to storing the indication of the preauthorization for the transaction, selecting, by the server, a second level of preauthorization of the plurality of levels of preauthorization for the transaction based on: (i) completion of multi-factor authentication for the account and (ii) the one or more rules; and storing the indication of the preauthorization in a memory of the contactless card,
wherein the stored indication of the preauthorization for the transaction comprises the second level of preauthorization.

11. The method of claim 9, wherein the server receives the EMV payload and location data describing a location of the POS device from the POS device, the method further comprising:
determining, by the server, that the location data is within the threshold distance of the location of the POS device; and
transmitting an indication of approval for the transaction to the POS device.

12. The method of claim 7, wherein approving the transaction further comprises:
receiving, by the server, a current time associated with the transaction;
determining a time difference between the current time and the timestamp of the preauthorization;
determining, by the server based on the one or more rules associated with the account, that the time difference is within a threshold amount of time;
receiving, by the server from the POS device, an indication of an amount of the transaction; and
determining, by the server based on the one or more rules associated with the account, that the amount of the transaction is less than a maximum spend amount associated with the contactless card.

13. An apparatus, comprising:
a processor circuit; and
a memory storing instructions which when executed by the processor circuit, cause the processor circuit to perform the steps of:
receiving a request from an account application of a mobile device, the request comprising encrypted data and location data, the location data associated with the mobile device;
decrypting the encrypted data using a cryptographic algorithm and a key, wherein the key is associated with a contactless card;
determining, based on one or more rules associated with an account and the decryption of the encrypted data, that the location data is within a threshold distance of one or more locations the contactless card is permitted for use;
preauthorizing a transaction based on the decryption of the encrypted data and the determination that the location data is within the threshold distance of the one or more locations the contactless card is permitted for use;
selecting a first level of preauthorization for the transaction from a plurality of levels of preauthorization based on the decryption of the encrypted data and the determination that the location data is within the threshold distance of the one or more locations the contactless card is permitted for use;
storing an indication of the preauthorization for the transaction, the indication comprising: (i) the first level of preauthorization, (ii) a timestamp of the preauthorization, and (iii) the location data, wherein the indication of the preauthorization is one of a plurality of indications of preauthorization, wherein each indication of preauthorization is for a respective transaction of a plurality of transactions including the transaction, wherein each indication of preauthorization further comprises a unique identifier of the respective indication of preauthorization;
transmitting, to the account application, the indication of the pre authorization for the transaction;
receiving, from a point of sale (POS) device, transaction data comprising: (i) an indication of an account number of the contactless card, (ii) an indication of an expiration date of the contactless card, and (iii) the indication of the preauthorization of the transaction, wherein the indication of the preauthorization of the transaction is received by the POS device from the contactless card, wherein the transaction data comprises an EMV payload;
identifying the indication of the preauthorization of the transaction in a first field of the EMV payload;
identifying the indication of the account number, the indication of the expiration date, and an indication of a card verification value (CVV) in one or more other fields of the EMV payload;
determining that the unique identifier of the indication of the preauthorization of the transaction in the EMV payload matches the unique identifier of the stored indication of the pre authorization for the transaction; and
approving the transaction based at least in part on the determination that the unique identifier of the indication of the preauthorization of the transaction in the EMV payload matches the unique identifier of the stored indication of the pre authorization for the transaction.

14. The apparatus of claim 13, the memory storing instructions which when executed by the processor circuit, cause the processor circuit to perform the steps of:
comparing the unique identifier of the stored indication of the preauthorization of the transaction to the unique identifier of the indication of the preauthorization of the transaction in the first field of the EMV payload; and
determining, based on the comparison, that the unique identifier of the stored indication of the preauthorization of the transaction matches the unique identifier of the indication of the preauthorization of the transaction in the first field of the EMV payload.

15. The apparatus of claim 14, the memory storing instructions which when executed by the processor circuit, cause the processor circuit to perform the step of:
prior to storing the indication of the preauthorization for the transaction, selecting a second level of preauthorization of the plurality of levels of preauthorization for the transaction based on: (i) completion of multi-factor authentication for the account and (ii) the one or more rules,
wherein the stored indication of the preauthorization for the transaction comprises the second level of preauthorization.

16. The apparatus of claim 15, the memory storing instructions which when executed by the processor circuit, cause the processor circuit to, prior to transmitting an indication of approval for the transaction to the POS device, perform the step of:
determining that the location data is within the threshold distance of a location of the POS device.

17. The apparatus of claim 15, the memory storing instructions which when executed by the processor circuit, cause the processor circuit to perform the steps of:
receiving a current time associated with the transaction;
determining a time difference between the current time and the time stamp of the preauthorization; and determining, based on the one or more rules associated with the account, that the time difference is within a threshold amount of time, wherein the transaction is further approved based on the determination that the time difference is within the threshold amount of time.

18. The method of claim 7, wherein decrypting the encrypted data comprises:

determining, by the server, that a customer identifier yielded by decrypting the encrypted data matches a customer identifier associated with the account.

* * * * *